US009883028B2

(12) United States Patent
Kenrick et al.

(10) Patent No.: US 9,883,028 B2
(45) Date of Patent: Jan. 30, 2018

(54) METHOD AND APPARATUS FOR PROVIDING INTERACTIVE MEDIA DURING COMMUNICATION IN CHANNEL-BASED MEDIA TELECOMMUNICATION PROTOCOLS

(75) Inventors: Brody Kenrick, San Francisco, CA (US); Marwan A. Jabri, Tiburon, CA (US)

(73) Assignee: ONMOBILE GLOBAL LIMITED, Bangalore (IN)

( * ) Notice: Subject to any disclaimer, the term of this patent is extended or adjusted under 35 U.S.C. 154(b) by 1330 days.

(21) Appl. No.: 11/496,058

(22) Filed: Jul. 28, 2006

(65) Prior Publication Data

US 2007/0201484 A1 Aug. 30, 2007

Related U.S. Application Data

(60) Provisional application No. 60/704,191, filed on Jul. 28, 2005.

(51) Int. Cl.
*H04M 3/42* (2006.01)
*H04L 29/06* (2006.01)

(52) U.S. Cl.
CPC .. *H04M 3/42017* (2013.01); *H04L 29/06027* (2013.01); *H04L 65/1043* (2013.01); *H04L 65/1069* (2013.01); *H04L 65/608* (2013.01)

(58) Field of Classification Search
CPC .......... H04M 3/42017; H04M 3/42093; H04L 29/06027; H04L 65/1043; H04L 65/1069; H04L 65/1096; H04L 65/608
(Continued)

(56) References Cited

U.S. PATENT DOCUMENTS 6,559,845 B1 5/2003 Harvill et al.
6,615,253 B1 * 9/2003 Bowman-Amuah ......... 709/219
(Continued)

FOREIGN PATENT DOCUMENTS

WO WO 2007/010098 A1 1/2007

OTHER PUBLICATIONS

Barnes et al.,"Early Media in SIP: Problem Statement, Requirements, and Analysis of Solutions," retrieved from the Internet: << http://quimby.gnus.org/internet-drafts/draft-barnes-sip-em-ps-req-sol-00.txt>>, dated Jan. 15, 2007.
(Continued)

*Primary Examiner* — Khaled Kassim
(74) *Attorney, Agent, or Firm* — Hoffmann & Baron, LLP

(57) ABSTRACT

A method of delivering a video ringback media stream to a first terminal includes transmitting a session signaling message from the first terminal to a ringback server, transmitting a session signaling response message from the ringback server to the first terminal, and establishing one or more channels between the ringback server and the first terminal. The method also includes establishing one or more media streams between a content device and the ringback server and processing the one or more media streams in the ringback server to form a video ringback media stream. The method further includes transmitting the video ringback media stream from the ringback server to the first terminal, transmitting a second session signaling message from the ringback server to a second terminal, and transmitting a second session signaling response message associated with answering a call from the second terminal to the ringback server. Transmitting the second session signaling response message is performed after transmitting a session signaling response message.

44 Claims, 16 Drawing Sheets

(58) Field of Classification Search
USPC .............................. 370/352–356; 348/14.01
See application file for complete search history.

(56) References Cited

U.S. PATENT DOCUMENTS

| | | | |
|---|---|---|---|
| 6,650,619 B1* | 11/2003 | Schuster et al. | ............. 370/230 |
| 6,799,038 B2 | 9/2004 | Gopikanth | |
| 6,954,612 B2 | 10/2005 | Cheng et al. | |
| 6,987,974 B1 | 1/2006 | Mostafa et al. | |
| 7,136,679 B2 | 11/2006 | Beauford | |
| 7,139,279 B2 | 11/2006 | Jabri et al. | |
| 7,139,380 B2 | 11/2006 | Burger | |
| 7,142,656 B2 | 11/2006 | Moody et al. | |
| 7,161,949 B2 | 1/2007 | Jabri et al. | |
| 7,180,156 B2 | 2/2007 | Chin et al. | |
| 7,206,316 B2 | 4/2007 | Jabri et al. | |
| 7,432,951 B1* | 10/2008 | Burritt | ................. H04N 7/147 348/14.01 |
| 7,483,441 B2 | 1/2009 | Jabri et al. | |
| 7,493,125 B2 | 2/2009 | Nagesh et al. | |
| 7,496,089 B2 | 2/2009 | Hiroshima et al. | |
| 7,680,875 B1* | 3/2010 | Shopiro et al. | ............... 709/200 |
| 2002/0026473 A1 | 2/2002 | Gourraud | |
| 2002/0176557 A1 | 11/2002 | Burger | |
| 2003/0059023 A1 | 3/2003 | Crockett et al. | |
| 2003/0200337 A1* | 10/2003 | Jabri et al. | ..................... 709/246 |
| 2004/0120494 A1* | 6/2004 | Jiang et al. | .............. 379/210.01 |
| 2004/0177382 A1* | 9/2004 | Choi | ............................ 725/135 |
| 2004/0252761 A1 | 12/2004 | Brown et al. | |
| 2005/0018659 A1* | 1/2005 | Gallant et al. | ................ 370/352 |
| 2005/0021713 A1* | 1/2005 | Dugan et al. | ................ 709/223 |
| 2005/0083948 A1 | 4/2005 | Hiroshima et al. | |
| 2005/0094796 A1* | 5/2005 | Beauford | ................ 379/211.01 |
| 2005/0105511 A1 | 5/2005 | Poikselka | |
| 2005/0105541 A1 | 5/2005 | Jain et al. | |
| 2005/0108328 A1* | 5/2005 | Berkeland et al. | ........... 709/204 |
| 2005/0221793 A1 | 10/2005 | Chin et al. | |
| 2006/0029041 A1 | 2/2006 | Jabri et al. | |
| 2006/0077990 A1 | 4/2006 | Lee et al. | |
| 2006/0087988 A1 | 4/2006 | Martinez | |
| 2006/0109819 A1* | 5/2006 | Marin et al. | .................. 370/331 |
| 2006/0109969 A1* | 5/2006 | Oh | ........................... 379/207.16 |
| 2006/0147010 A1 | 7/2006 | Batni et al. | |
| 2006/0153352 A1* | 7/2006 | Schmidt et al. | ......... 379/202.01 |
| 2006/0159037 A1 | 7/2006 | Jabri et al. | |
| 2006/0177044 A1 | 8/2006 | O'Neil et al. | |
| 2006/0210033 A1 | 9/2006 | Grech et al. | |
| 2006/0210040 A1 | 9/2006 | Citron et al. | |
| 2006/0233328 A1 | 10/2006 | Radziewicz et al. | |
| 2006/0250991 A1 | 11/2006 | Jabri et al. | |
| 2006/0250992 A1 | 11/2006 | Jabri et al. | |
| 2006/0251232 A1* | 11/2006 | Wuthnow et al. | ....... 379/201.01 |
| 2006/0291640 A1* | 12/2006 | Nagesh | ................... H04M 3/02 379/211.02 |
| 2007/0014251 A1 | 1/2007 | Jabri et al. | |
| 2007/0047728 A1* | 3/2007 | Raju | ................. H04L 29/06027 379/373.02 |
| 2007/0060163 A1 | 3/2007 | Jabri et al. | |
| 2007/0129052 A1 | 6/2007 | Jabri et al. | |
| 2007/0172051 A1* | 7/2007 | Hoffmann | ..................... 379/360 |
| 2007/0266161 A1 | 11/2007 | Kenrick et al. | |

OTHER PUBLICATIONS

Ejzak, "Private Header (P-Header) Extension to the Session Initiation Protocol (SIP) for Authorization of Early Media," retrieved from the Internet: << http://tools.iettorg/html/draft-ejzak-sipping-p-em-auth-03>>, dated Jan. 1, 2007.
Stucker, [Abstract Only] "Coping with Early Media in the Session Initiation Protocol (SIP),"Retrieved from the Internet: << http://doc.tm.uka.de/i-d/individual/stucker/draft-stucker-sipping-early-media-coping.txt.gz>> dated Oct. 18, 2006.
Camarillo et al, "Best Current Practice for ISUP to SIP Mapping." IETF Draft. Mar. 2000.
Non-Final Office Action for U.S. Appl. No. 11/690,733 dated Jul. 24, 2009; 18 pages.
Non-Final Office Action for U.S. Appl. No. 11/690,730 dated Oct. 27, 2009; 15 pages.

* cited by examiner

METHOD AND APPARATUS FOR PROVIDING INTERACTIVE MEDIA DURING COMMUNICATION IN CHANNEL-BASED MEDIA TELECOMMUNICATION PROTOCOLS

CROSS-REFERENCES TO RELATED APPLICATIONS

This application claims priority to U.S. Provisional Application No. 60/704,191, filed on Jul. 28, 2005, which is hereby incorporated by reference in its entirety for all purposes.

COPYRIGHT NOTICE

A portion of this application contains computer codes, which are owned by Dilithium Networks Pty Ltd. All rights have been preserved under the copyright protection, Dilithium Networks Pty Ltd. ©2006.

BACKGROUND OF THE INVENTION

Methods of providing arbitrary media during multimedia telecommunication (a multimedia "call") between equipment ("terminals"). More particularly, the invention provides methods for introducing arbitrary media during calls between terminals that implement channel-based telecommunications protocols such as the Internet Engineering Task Force (IETF) Session Initiation Protocol (SIP), the International Telecommunication Union (ITU) Telecommunication Standardisation Sector (ITU-T) H.323 Recommendation, the ITU-T H.324 Recommendation and other Standards and Recommendations derived from or related to these. More specifically, it relates to a method and apparatus of providing configurable and interactive media at various stages of a communication session in channel-based media telecommunication protocols with media supplied into channels of involved terminals based on preferences of an operator, originator and receiver. Merely by way of example, the invention has been applied to the establishment of multimedia telecommunication between the 3GPP 3G-324M (protocol adapted from the ITU-T H.324 protocol) multimedia handsets on a mobile telecommunications network, but it would be recognized that the invention may also include other applications.

H.324 is an International Telecommunication Union (ITU) protocol standard for multimedia communication over general switched telephone networks (GSTN). H.324M is the name commonly used for the H.324 with Annex C (mobile extensions) and is an extension of H.324 for operations over mobile networks, and 3G-324M is a recommendation by the third generation partnership program (3GPP) defining adaptation of H.324M for use within 3GPP networks and also adopted by 3GPP2. 3GPP has also adapted IETF SIP for use in packet switched networks, this adaptation is called SIP/IMS.

Without any loss of generality we use the term "equipment" to indicate either a user end equipment such as a handset, or network end equipment such as a switch or gateway. The term "equipment" covers the meaning of "entity." We also use the terms "equipment" and "terminal" interchangeably, and they both indicate the same meaning in the present document.

The key steps involved in setting up and connecting a typical 3G-324M call are as follows:

1. Call signaling (bearer establishment)—outside the scope of H.324. Normally a modem connection if GSTN, through ISDN, or signaling through mobile switching centres in the mobile case.
2. Mobile level detection (MLD)—Where a common Mobile Level is agreed on between equipments. This step is performed by H.324 equipment that supports mobile extensions such as H.324M and 3G-324M equipment.
3. Terminal Capability Exchange (TCS)—H.245 Messaging
4. Master Slave determination (MSD)—H.245 Messaging
5. Open/Close Logical Channels (OLC)—H.245 Messaging
6. Multiplexer Table Entries Exchange (MTE)—H.245 Messaging In Step (1) an end-to-end bearer between equipments is established. This stage is called Call Signaling. In a third Generation (3G) network, where 3G-324M is employed, a user terminal connects to another user terminal via network elements; network element to user terminal interactions make use of ITU-T Recommendation Q.931, network element to network element connections make use of Signaling System 7 (SS7) Integrated Systems Digital Network User Part (ISUP).

FIG. 1 illustrates a conventional connection architecture for MS-to-MS H.324 calls. As merely an example, in FIG. 1, a simplified depiction of network elements involved in a typical 3G-324M call between two terminals is shown. A terminal originating a call (TOC) 110, a terminal terminating a call (TTC) 190, a mobile switching centre (MSC) associated with a TOC (OMSC) 120 and an MSC associated with TTC (TMSC) 180. OMSC and TMSC may be collocated. A charging function is marked as CHARGING 150.

FIG. 2 illustrates conventional session establishment of a terminal originating call and a setup request to a terminal terminating call. A TOC 210 initiates call set-up procedure by sending a Q.931 SETUP message to OMSC 220. OMSC 220 sends an ISUP Initial Address Message (IAM) to TMSC 224. TMSC 224 sends a SETUP message to TTC 230 associated with the number dialled. The SETUP message informs TTC 230 of the incoming call. TTC 230 sends an ALERTING message to TMSC 224 indicating that ringing has started. TMSC 224 sends an ISUP Address Completed Message (ACM) to OMSC 220. OMSC 220 connects a ringing (ringback or alerting) tone to TOC 210 by sending an ALERTING message.

TTC 230 is ringing and may answer the call. The duration of the ringing period is variable and unknown to TOC 210 at time of call origination. Although a 3G-324M terminal has the ability to display audio and video, TOC 210 is receiving and playing back a conventional, audio only, ringback tone for the duration of the ringing period.

If TTC 230 answers, a CONNECT message is sent from TTC 230 to TMSC 224. TMSC 224 sends an ISUP Answer Message (ANM) to OMSC 220. OMSC 220 sends a CONNECT to TOC 210.

In a typical call, a charging event is sent from OMSC 220 to the charging entity (CHARGING 222) indicating the start of the session. Charging events can be operator defined and are likely to occur elsewhere in a session to provide accurate billing of network usage, in the network and from other elements to provide accurate billing of network usage.

The call signaling is now complete and a communication link, the bearer, now exists between TOC 210 and TTC 230. Once call signaling completes, further steps are used to establish the H.324 session, to provide a means of transporting video, audio and data between the equipment in a format that is known to and supported by the equipment. In order to do this, H.324M makes use of two further ITU-T Recommendations.

The first of these Recommendations is H.223 "Multiplexing protocol for low bit rate multimedia communication." H.223 specifies a frame-oriented multiplexing protocol which allows the transfer of any combination of digital voice, video and data (e.g., command and control) information over a single communication link. The H.223 may have a number of modes of operation, specified in Annexes A, B and C of the H.223 Recommendation, that are intended to provide increased resilience in the presence of errors. These are also known as Mobile Levels 1, 2 and 3. H.223 without the application of any of these Annexes is also sometimes referred to as operating at Mobile Level 0 (base-line). H.324 has the concept of Logical Channels which is a way of providing virtual channels over the circuit switched link. The role of the multiplexer is to combine (multiplex) parts of the data chunks written on the logical channels into frames known as a Multiplexer Protocol Data Unit (MUX-PDU). Logical Channel 0 is always available and is used for Command and Control. Data (voice, video, command and control and other general data) is passed to/from the H.223 multiplexer through bitstream chunks called service data units (SDUs). Before being multiplexed, these different SDUs go through Adaptation Layers where extra information may be added for purposes such as error detection, sequence numbering and retransmission requests.

The second of these Recommendations is H.245 "Control protocol for multimedia communication," which specifies the syntax and semantics of terminal information messages as well as procedures to use messaging for in-band negotiation at the start of or during communication. The messages cover receiving and transmitting capabilities and preferences, logical channel signaling and control and indication. The messages that are specified in H.245 are expressed in the ITU-T Abstract Syntax Notation (ASN.1) and can be classified as of Request, Response, Command or Indication type. H.245 messages are encoded according to the ASN.1 standard before being transmitted. When a terminal sends an H.245 message of type Request it requires that an appropriate message of type Response is sent by the remote terminal. If the Response (sometimes referred to as an Ack for Acknowledgement) is not received within a certain time, the sending terminal will re-transmit the Request or take another appropriate action if no response has been received for repeated Requests. Retransmission of requests may occur a number of times. Many of the H.245 messages associated with call setup are of the Request type.

H.245 also requires a reliable link layer for proper operation. The principal means of providing this, specified in Annex A of H.324, is to use the Simple Retransmission Protocol (SRP) or the Numbered Simple Retransmission Protocol (NSRP), in which one or more H.245 messages, known collectively as a MultimediaSystemControl PDU and in the present document as an H.245 PDU, are formed into SRP Command Frames prior to sending, and the receiving terminal must send an SRP Response Frame (Sometimes referred to as an SRP Ack) to acknowledge correct receipt of an SRP Command Frame. No further H.245 messages may be sent by a terminal until the SRP Ack for the last message has been received.

Step (2) is H.223 mobile level detection/multiplexer synchronization phase. This consists of each terminal transmitting a repeating pattern of bits (flags) that indicate the highest Mobile Level that it operates at. Each terminal examines the flags that it is receiving. If these flags represent a lower Mobile Level then the terminal drops down to the same lower level. When both terminals are transmitting the same flag sequence this step completes.

Steps (3) to (6) are performed using a sequence of H.245 Request and Response messages as described above. Note the order of steps (5) and (6) above can be interchanged. It should be noted that Steps (3) to (6) relate to procedures that are defined by underlying state machines that are also known as Signaling Entities. The relevant signaling entities are:

1. Capability Exchange Signaling Entity (CESE)
 2. Master Slave Determination Signaling Entity (MSDSE)
 3. Logical Channel Signaling Entity (LCSE)
 4. Multiplex Table Signaling Entity (MTSE)

However, in order to establish an H.324 session with logical channels in each direction, the key steps above are often handled sequentially.

The ITU Recommendation H.323 uses H.245 in a similar manner to H.324 for signaling command, control and indication messages related to a call. IETF Session Initiation Protocol (SIP) uses a different method, Session Description Protocol (SDP), for establishment of terminal capabilities and logical channels.

For H.324M, Step (3), Terminal Capabilities Set request (TCS) step requires the terminal capabilities are exchanged via independent Terminal Capability Set (TCS) requests. These allow the signaling of the terminals supported capabilities including multiplexer capability, supported codecs and parameters associated with the codecs. TCS also specify other terminal limitations on simultaneity of reception of specific codec types, or interdependence between codec types for simultaneous transmit and receive.

For H.324M, Step (4), the master slave relationship (MS) is determined by dependent Master Slave Determination (MSD) requests. After a master is decided it then takes responsibility for resolving incompatible requests between the terminals.

For H.324M, Step (5), Open Logical Channel (OLCs) are used to create logical channels (LC) as a path for the transmission of information. A logical channel is opened by a terminal wishing to send media by the Open Logical Channel (OLC) request. Each logical channel has characteristics that are specified in the OLC request. These characteristics ensure a terminal is capable of receiving and decoding data that will be received on the channel. Logical channels may be opened as bidirectional channels, where a forward and a reverse channel are created simultaneously. OLCs are acknowledged by the receiving terminal.

For H.324M, Step (6), the Multiplexer Table Entries (MTEs) indicate to the remote terminal how the transmitting terminal intends to format the media payload. MTEs are acknowledged by the receiving terminal.

Once these steps have completed, media (video, audio and data) can flow between the terminals. Session media flowing in logical channels is indicated by "SessMedia" in the Figures. Note the H.245 messages flow on the Logical Channel 0 which as previously described is predefined and carried by the means of the multiplexer predefined Multiplex Table Entry 0. Once other Multiplex Table Entries have been exchanged these can also be used in conjunction with H.245 messages.

Session characteristics pertaining to logical channel characteristics for 3G-324M are shown in Table 2. The modification of some session characteristics is allowed during a session in 3G-324M, allowed modifications and methods are indicated in Table 1.

TABLE 1

| Characteristic | Decision at session setup | Modification during session |
|---|---|---|
| Mobile level (ML) | Mobile level detection | H.245 negotiation and ML detection |
| Terminal capabilities (TCS) | H.245 negotiation | H.245 negotiation |
| Master-Slave relationship (MS) | H.245 negotiation | Not allowed |
| Multiplexer table entries (MTE) | H.245 negotiation | H.245 negotiation |
| Logical Channels (LC) | H.245 negotiation | H.245 negotiation |

TABLE 2

| Characteristic | Relevant information |
|---|---|
| Logical channel number (LCN) | — |
| Type of channel | — |
| Adaptation layer | — |
| Segmentable | — |

Fast setup technologies, for example H.323 fastconnect, H.324 answerfast and related techniques (described more fully in U.S. Patent Application Publication Nos. 2004/0174817 and 2006/0029041, both of which are commonly assigned, and incorporated herein by reference for all purposes), SIP answer/offer, and SIP "early media", and the like, may alter the negotiation process, but do not alter the resultant characteristics of a session. In some cases, the resultant characteristics may be limited to a reduced set of characteristics when compared to regular negotiation.

The closing of logical channels and the re-opening of logical channels, by H.245 Close Logical Channel (CLC) messages and (Open Logical Channel) OLC messages respectively, is allowed during the session.

The key steps involved in tearing down a typical 3G-324M call are as follows:

H1. Close Logical Channels (CLC)—H.245 Messaging.
H2. End of Session Command (EndSession)—H.245 Messaging.
H3. Call signaling (bearer release)—outside the scope of H.324.

Call teardown may happen in an orderly way, involving Steps (H1), (H2) and (H3), may just involve Step (H2) and (H3), may just involve just Step (H3), or may be caused by loss of communication. According to embodiments of the present invention, the terminal will handle any call teardown procedure gracefully.

By way of example, TOC 210 decides to terminate the session by terminating the bearer, i.e., Step (H3): Call signaling for call teardown, without sending H.245 messages. Step (H3) begins with TOC 210 sending a DISCONNECT message to OMSC 220. OMSC 220 signals an ISUP RELEASE to TOC 210. A charging event may be sent from OMSC 220 to CHARGING 222 indicating the end of the session for billing purposes.

OMSC 220 sends an ISUP RELEASE message to TMSC 224. TOC 210 sends a reply ISUP RELEASE_COMPLETE message to OMSC 220. TMSC 224 sends a return ISUP RELEASE_COMPLETE (RLC) message to OMSC 220, and a DISCONNECT message to TTC 230. TTC 230 sends a reply RELEASE message to TMSC 224. TMSC 224 replies to TTC 230 with a RELEASE_COMPLETE message. The call is now finished and all parties are returned to initial states ready to make new calls.

From the above, it is seen that in a 3G network, in spite of inherent terminal and network capabilities for multimedia display, when TOC 210 performs the steps described above, the media sent to TOC 210 from the network, as TTC 230 rings awaiting answer, is conventional audio (voice). Thus, there is a need in the art for methods and techniques for supplying multimedia content to terminals communicating through telecommunication protocols.

SUMMARY OF THE INVENTION

According to the present invention, a technique for supplying configurable content to parties involved in a telecommunication session is provided. More particularly, the invention provides a method and apparatus for providing interactive and arbitrary media stream(s) during communications between terminals that implement channel-based media telecommunication protocols.

According to an embodiment of the present invention, a method of delivering a media stream to a first device from a media server using a channel based protocol is provided. The method includes transmitting a first session signaling message from the first device to the media server, transmitting a second session signaling message from the media server to the first device, and establishing one or more channels between the media server and the first device. The method also includes establishing one or more first media streams between a content device and the media server, processing the one or more first media streams in the media server to form one or more first processed media streams, and transmitting the one or more first processed media streams from the media server to the first device using the one or more channels. The method further includes transmitting a third session signaling message from the media server to a second device, transmitting a fourth session signaling message from the second device to the media server, and establishing one or more second media streams between the second device and the media server. Moreover, the method includes processing the one or more second media streams in the media server to form one or more second processed media streams and transmitting the one or more second processed media streams from the media server to the first device using the one or more channels.

According to another embodiment of the present invention, a method of delivering a media stream from a media server to a first device using a channel based protocol is provided. The method includes transmitting a first session signaling message from the first device to the media server, transmitting a second session signaling message from the media server to the first device, and establishing one or more channels between the media server and the first device. The method also includes establishing one or more first media streams between a content device and the media server, transmitting a third session signaling message from the media server to a second device, and transmitting a fourth session signaling message from the second device to the media server. The method further includes establishing one or more second media streams between the second device and the media server, processing at least one of the one or more first media streams or the one or more second media streams in the media server to form one or more processed media streams, and transmitting the one or more processed media streams from the media server to the first device using the one or more channels.

According to yet another embodiment of the present invention, a method of delivering a video ringback media stream to a first terminal is provided. The method includes transmitting a session signaling message from the first terminal to a ringback server, transmitting a session signaling response message from the ringback server to the first terminal, and establishing one or more channels between the ringback server and the first terminal. The method also includes establishing one or more media streams between a content device and the ringback server and processing the one or more media streams in the ringback server to form a video ringback media stream. The method further includes transmitting the video ringback media stream from the ringback server to the first terminal using the one or more channels, transmitting a second session signaling message from the ringback server to a second terminal, and transmitting a second session signaling response message associated with answering a call from the second terminal to the ringback server. Transmitting the second session signaling response message is performed after transmitting a session signaling response message.

According to a alternative embodiment of the present invention, a method of providing media streams in a telecommunications network utilizing a first terminal and a second terminal is provided. The method includes transmitting a first session signaling message from the first terminal to a media server, transmitting a second session signaling message from the media server to the first terminal, and establishing one or more channels between the media server and the first terminal. The method also includes establishing a first media stream between a content device and the media server, transmitting a first media stream from the media server to the first terminal using the one or more channels, and transmitting a third session signaling message from the media server to the second terminal. The method further includes transmitting a fourth session signaling message from the second terminal to the media server, establishing a second media stream between the second terminal and the media server, and determining a predetermined media feature in the second media stream. Moreover, the method includes transmitting a third media stream from the media server to the first terminal using the one or more channels.

According to another alternative embodiment of the present invention, a method of providing a first media stream and a second media stream in a telecommunications network utilizing a first terminal and a second terminal is provided. The method includes transmitting a first session signaling message from the first terminal to a media server, transmitting a second session signaling message from the media server to the first terminal, and establishing one or more channels between the media server and the first terminal. The method also includes establishing a first media stream between a content device and the media server, transmitting a first media stream from the media server to the first terminal using the one or more channels, and transmitting a third session signaling message from the media server to the second terminal. The method further includes transmitting a fourth session signaling message from the second terminal to the media server, establishing a second media stream between the second terminal and the media server, and generating a predetermined media feature in a third media stream. The predetermined media feature is generated in the media server. Moreover, the method includes transmitting the third media stream from the media server to the first terminal using the one or more channels.

According to yet another alternative embodiment of the present invention, a method of providing media streams during a session cutover process in a telecommunications network utilizing a first terminal and a second terminal is provided. The method includes transmitting a first session signaling message from the first terminal to a media server, transmitting a second session signaling message from the media server to the first terminal, and establishing one or more first channels between the media server and the first terminal. The method also includes establishing a first media stream from a content device to the media server and transmitting a second media stream from the media server to the first terminal using the one or more first channels. The second media stream is associated with the first media stream. The method further includes transmitting a third session signaling message from the media server to the second terminal, transmitting a fourth session signaling message from the second terminal to the media server, and establishing one or more second channels between the media server and the second terminal. Moreover, the method includes transmitting a third media stream from the first terminal to the media server using the one or more first channels and transmitting a fourth media stream from the second terminal to the media server using the one or more second channels.

According to a specific embodiment of the present invention, a method of providing video ringback services to terminals in a telecommunications network is provided. The method includes storing a media content in one or more memories disposed in a content server, wherein the media content is stored in a first format and establishing a first media stream between the content server and a media server. The method also includes establishing a second media stream between the media server and at least one of a first H.324-like terminal or a SIP-like terminal, establishing a third media stream between the media server and a second H.324-like terminal and transcoding the media content in the media server to form a first ringback media stream characterized by a second format. The method further includes transmitting the first ringback media stream to the at least one of the first H.324-like terminal or the SIP-like terminal, transcoding the media content in the media server to form a second ringback media stream characterized by a third format different from the second format, and transmitting the second ringback media stream to the second H.324-like terminal.

According to another specific embodiment of the present invention, a method of charging for media content delivered through a telecommunications network is provided. The method includes transmitting a first session signaling message from a first device to a media server, transmitting a second session signaling message from the media server to the first device and establishing one or more channels between the media server and the first device. The method also includes establishing one or more first media streams between a content server and the media server, determining an occurrence of a transition event, and initiating a charging event associated with the transition event.

According to yet another specific embodiment of the present invention, a method of delivering a video ringback media stream to a first terminal is provided. The method includes transmitting a session signaling message from the first terminal to a ringback server, transmitting a session signaling response message from the ringback server to the first terminal, and establishing one or more channels between the ringback server and the first terminal. The method also includes establishing one or more media streams between a content device and the ringback server, processing the one or more media streams in the ringback server to form a video ringback media stream, and transmitting the video ringback media stream from the ringback server to the first terminal using the one or more channels. The method further includes transmitting a second session signaling message from the ringback server to a second terminal and transmitting a second session signaling response message associated with answering a call from the second terminal to the ringback server. Transmitting the second session signaling response message is performed after transmitting the session signaling response message. Moreover, the method includes reducing an involvement of the ringback server from a level associated with call establishment.

According to an embodiment of the present invention, a method of delivering a video ringback media stream to a 3G-324M terminal is provided. The method includes transmitting a first Q.931 SETUP message from the 3G-324M terminal to a ringback server, transmitting a first Q.931 CONNECT message from the ringback server to the 3G-324M terminal, and establishing one or more first channels between the ringback server and the 3G-324M terminal. The method also includes establishing one or more media streams between a content device and the ringback server, processing the one or more media streams in the ringback server to form the video ringback media stream, and transmitting the video ringback media stream from the ringback server to the 3G-324M terminal using the one or more first channels. The method further includes transmitting a session signaling message from the ringback server to a second terminal and transmitting a second session signaling message associated with answering a call from the second terminal to the ringback server. Transmitting the second session signaling message is performed after transmitting the first Q.931 CONNECT message. Moreover, the method includes establishing one or more second channels between the ringback server and the second terminal and associating the one or more first channels and the one or more second channels at the ringback server.

According to a specific embodiment of the present invention, a system for transmitting media between a first mobile handset, a second mobile handset, and a gateway is provided. The system includes a gateway and a content server coupled to the gateway. The gateway is configured to receive video ringback content from the content server. The systems also includes a first handset coupled to the gateway and adapted to receive the video ringback content from the gateway and a second handset coupled to the gateway. The gateway is further configured to receive media from the second handset and transmit the media from the second handset to the first handset.

Embodiments of the present invention may be used to supply media at any time during a session while a terminal is connected. The media offered could take one of many forms, with non-limiting examples being: personalized or customized ringback tones, interactive media (e.g., entertainment or advertisements) at any stage of a call, and comfort media in place of media not supplied from a remote session. It will be recognized that the embodiments of the invention may also include other applications.

According to the present invention, techniques for supplying configurable media to terminals involved in channel-based media telecommunication call are provided. An agent serving as a termination point for session parties and content providers allows for configurable media to be supplied on any or all media channels of session parties, either in concert or independently, at various stages of a call. The agent could be described as a Media Personalization Server (MPS) of content and decision on content to supply can be made using the agent's knowledge of a call (i.e., called and calling party numbers, phase of call) and network information (i.e., subscriber information). It should be noted that although the invention is referred to as a Media Personalization Server, it need not be limited to that particular embodiment. Where MPS is used it should be interpreted as the invention.

In a specific embodiment, a configurable media stream is supplied to a TOC as it awaits answering at a TTC. This media supply will henceforth be known as a personalized video ringback (PVRB). In a further refinement of this example the invention has been applied to PVRB in telecommunication between 3G-324M (an H.324M based protocol) multimedia handsets on a mobile telecommunications network.

In an alternative specific embodiment, a configurable media stream is supplied to a non-originating party at call setup. In a further refinement of this example the invention has been applied to telecommunication between 3G-324M (H.324M based protocol) multimedia handsets on a mobile telecommunications network.

In an alternative specific embodiment, a configurable media stream is supplied to a non-terminating party at call tear down. In a further refinement of this example the invention has been applied to telecommunication between 3G-324M (H.324M based protocol) multimedia handsets on a mobile telecommunications network.

In an alternative specific embodiment, a configurable media stream is supplied to a terminal allowing interaction between a user and content. In a further refinement of this example the invention has been applied to telecommunication between 3G-324M (H.324M based protocol) multimedia handsets on a mobile telecommunications network.

In an alternative specific embodiment, a configurable media stream is supplied periodically (or aperiodically) interrupting a session with media. In a further refinement of this example the invention has been applied to telecommunication between 3G-324M (H.324M based protocol) multimedia handsets on a mobile telecommunications network.

In an alternative specific embodiment, a configurable media stream is created by mixing personalized content with session content. In a further refinement of this example the invention has been applied to telecommunication between 3G-324M (H.324M based protocol) multimedia handsets on a mobile telecommunications network.

In an alternative specific embodiment, the invention provides a method to intercept communications between two parties and divert to a capturing entity. In a further refinement of this example the invention has been applied in telecommunication between 3G-324M (H.324M based protocol) multimedia handsets on a mobile telecommunications network.

The system has one or more memories, which may be in a single device or multiple devices. The memory or memories include various computer codes that carry out the functionality described herein. The codes can be in software, hardware, or a combination of these, depending upon the embodiment. Depending upon the embodiment, other computer code can exist to carry out the functionality described herein.

The objects, features, and advantages of the present invention, which to the best of our knowledge are novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

Figure 1:
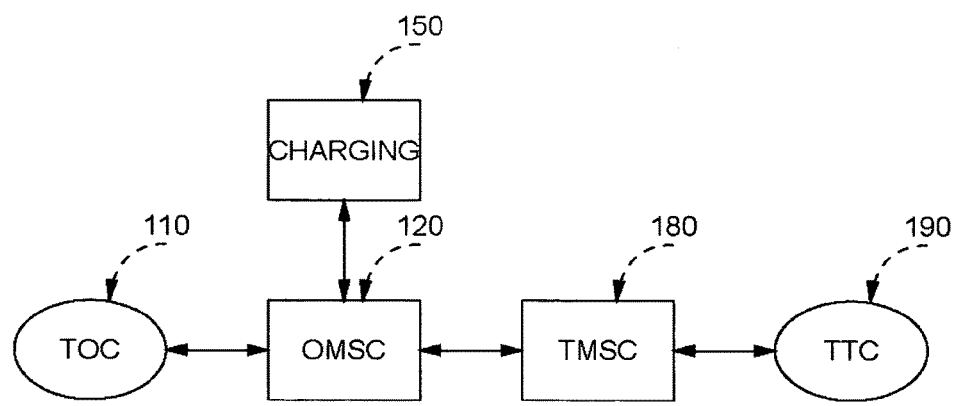
FIG. 1 illustrates a conventional connection architecture for MS-to-MS H.324 calls.
Figure 2:
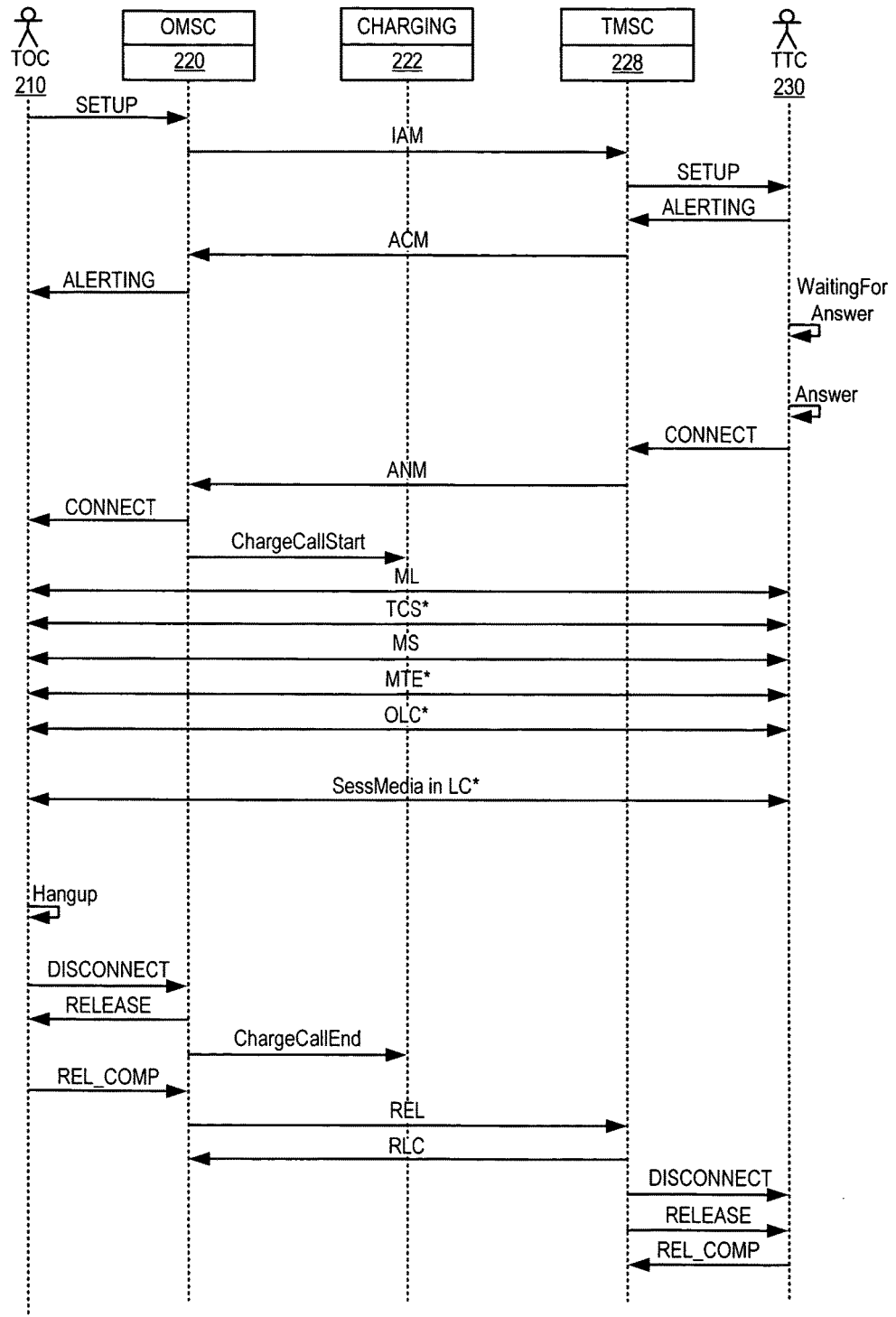
FIG. 2 illustrates conventional session establishment of a terminal originating call and a setup request to a terminal terminating call.

According to the present invention, a technique for supplying configurable content to parties involved in a telecommunication session is provided. More particularly, the invention provides a method and apparatus for providing interactive and arbitrary media stream(s) during communications between terminals that implement channel-based media telecommunication protocols.

Embodiments of the present invention include methods and systems that provide non-ordinary media content to a terminal originating a call that is highly desirable at various stages of the session. Content could be personalized media, either selected by the subscribers involved or the network operator.

Based on the discussion of conventional call procedures above, a way of providing configurable media other than conventional audio and supplying such media to either party during the session is also desirable. Content could be personalized media, either selected by the subscribers involved or the network operator, and with the additional content source of session media. The richness of media supplied to a party during the session is also desirable, and further enhancements such as interactivity and/or mixed media sessions could be delivered.

According to embodiments of the present invention, techniques for supplying configurable media to terminals involved in channel-based media telecommunication call are provided. An agent serving as a termination point for session parties and content providers allows for configurable media to be supplied on any or all media channels of session parties, either in concert or independently, at various stages of a call. This interposing agent could be described as Personalized Media Server Back to Back User Agent (B2BUA) as it may be seen as user agents connected to session parties, including non-terminal participants like content or capture devices, and participates in all call activities (complete session of itself) to each party. Personalization of media content and decision on content to supply can be made using PMS's knowledge of a call (i.e., called and calling party numbers, phase of call) and a network (i.e., subscriber information).

The method described above is generic and can be implemented in many different ways by a person skilled with the field. We describe below example embodiments to illustrate the methods which can be adapted easily to suit specific equipment needs.

Embodiments of the present invention include methods and systems for providing Personalized Video Ringback services. Merely by way of example, embodiments of the present invention are described with reference to FIGS. 3-10. A configurable media stream is supplied to TOC as it awaits answering at TTC. This media supply will henceforth be known as a personalized video ringback (PVRB). In a further refinement of this example the invention has been applied to PVRB in telecommunication between 3G-324M (an H.324 based protocol) multimedia handsets on a mobile telecommunications network.

The 3G-324M protocol is used here for illustrative purposes only. The methods described here are generic and apply to the processing of sessions between virtually any pair of channel-based terminals over virtually any connection protocol. A person skilled in the relevant art will recognize that other steps, configurations and arrangements can be used without departing from the spirit and scope of the present invention.

The description makes reference to a call involving two terminals, a TOC and a TTC. The terminology "terminal" as used herein is not limited to terminal devices but can also represent other entities in a network behaving as a terminal's proxy or otherwise. Examples of other devices included within the scope of the term "terminal" include servers, handsets, gateways, computers, mobile telephones, PDAs, smart phones, PSTN phones, and the like.

Figure 3A:
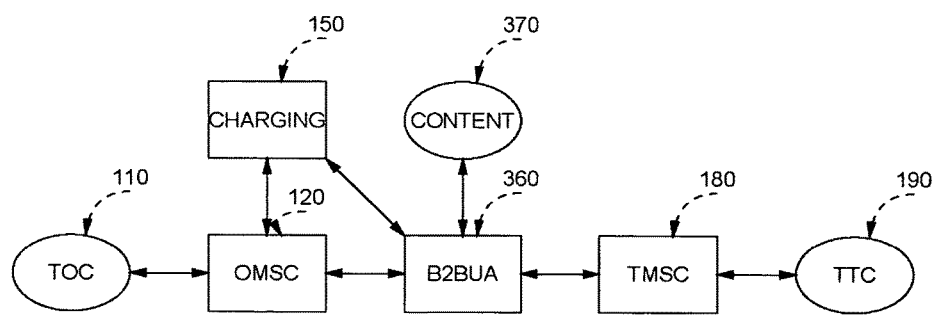
FIG. 3A illustrates a connection architecture for MS-to-MS H.324 calls according to an embodiment of the present invention.

FIG. 3A illustrates a connection architecture for MS-to-MS H.324 calls according to an embodiment of the present invention. Referring to FIG. 3A, a Personalized Media Server Back-to-Back User Agent (B2BUA) 360 is added into a network. According to embodiments of the present invention, the B2BUA 360 is positioned at a number of points of the network between the TOC 110 and the TTC 190. In the embodiment illustrated in FIG. 3A, B2BUA 360 is positioned on the network side of an MSC (i.e., OMSC 120), although B2BUA in embodiments may contain an MSC, and may be contained in an MSC, or collocated with other elements. Thus, the connection architecture illustrated in FIG. 3A is provided merely by way of example since a B2BUA can be placed at any point in a network, with interfaces compatible to its connections. The entity can also be placed in the empty network, if two terminals were directly connected prior to introduction of the B2BUA 360.

As well as being non-limiting of protocol, a B2BUA 360 need not have limits on terminal capabilities. If a B2BUA 360 encompasses a transcoding gateway (e.g., as described in U.S. Patent Application Publication No. 2003/0028643, commonly assigned, and incorporated herein by reference for all purposes) then protocol and terminal capabilities might be able to be terminated independently and the transcoding gateway could still ensure compatibility between the differently capable endpoints.

Referring to FIG. 3A, an entity adapted to serve content (CONTENT 370) is added into a network, with a compatible connection to B2BUA 360. The type and method of operation of the content server need not be specified by a particular protocol, but by way of example, the content server CONTENT 370 could use an interactive session based protocol. In a particular embodiment, an RTSP (Real Time Streaming Protocol) server could be a subpart of CONTENT 370. The interface between B2BUA 360 and CONTENT 370 is demonstrated as a simplified ISUP/H.324 connection. The interface between B2BUA 360 and CONTENT 370 can be a proprietary interface or any choice of standard interface. When B2BUA encompasses a transcoding gateway, then the content delivered by CONTENT to B2BUA might possibly be stored in a reduced number of formats and then transcoded on the fly by the transcoding gateway. An example might be store a single high quality media sample (e.g. broadcast quality, or high quality H.264) and transcode/transrate/transsize the content to the format as negotiated to each endpoint. This has advantages on storage but also on management of content and also subscription to the content.

The interfaces offered by a B2BUA 360 to terminals need not be identical. As a non-limiting example, a media gateway could also be incorporated in a B2BUA 360, with ISUP offered to a first interface and ISDN to another. H.323, H.324 and SIP are other variant protocols that can benefit from this method.

Referring to FIG. 3A, an entity adapted to serve content (CONTENT 370) is added into a network, with a compatible connection to B2BUA 360. The type and method of operation of the content server need not be specified by a particular protocol, but by way of example, the content server CONTENT 370 could use an interactive session based protocol. In a particular embodiment, an RTSP (Real Time Streaming Protocol) server could be a subpart of CONTENT 370. The interface between B2BUA 360 and CONTENT 370 is demonstrated as a simplified ISUP/H.324 connection. The interface between B2BUA 360 and CONTENT 370 can be a proprietary interface or any choice of standard interface. When B2BUA encompasses a transcoding gateway, then the content delivered by CONTENT to B2BUA might possibly be stored in a reduced number of formats and then transcoded on the fly by the transcoding gateway. An example might be store a single broadcast quality media sample and transcode/transrate/transsize the content to the format as negotiated to each endpoint. This has advantages on storage but also on management of content and also subscription to the content.

As would be evident by the protocol flexibility of the B2BUA 360, there are many places in a network where it could reside. The location illustrated in FIG. 3A is merely provided by way of example. The content server 370 includes one or more memories (not shown) according to an embodiment of the present invention. The one or more memories are adapted to store multimedia content in a variety of formats. Merely by way of example, the multimedia content may include audio, video, still images, data, combinations thereof, and the like. Content is stored in a variety of formats as appropriate to the particular application. As an example, formats supported and/or utilized by embodiments of the present invention include 3GPP file format, MPEG-4, Real-format, WMV, AVI, Quicktime, and the like.

Referring to FIG. 3A, CHARGING 150 may be logically or physically separated from other entities, but may also be collocated. CHARGING incorporated into an MSC is one possible collocation. Other possibilities would be employed depending on the billing scheme or model employed.

Figure 3B:
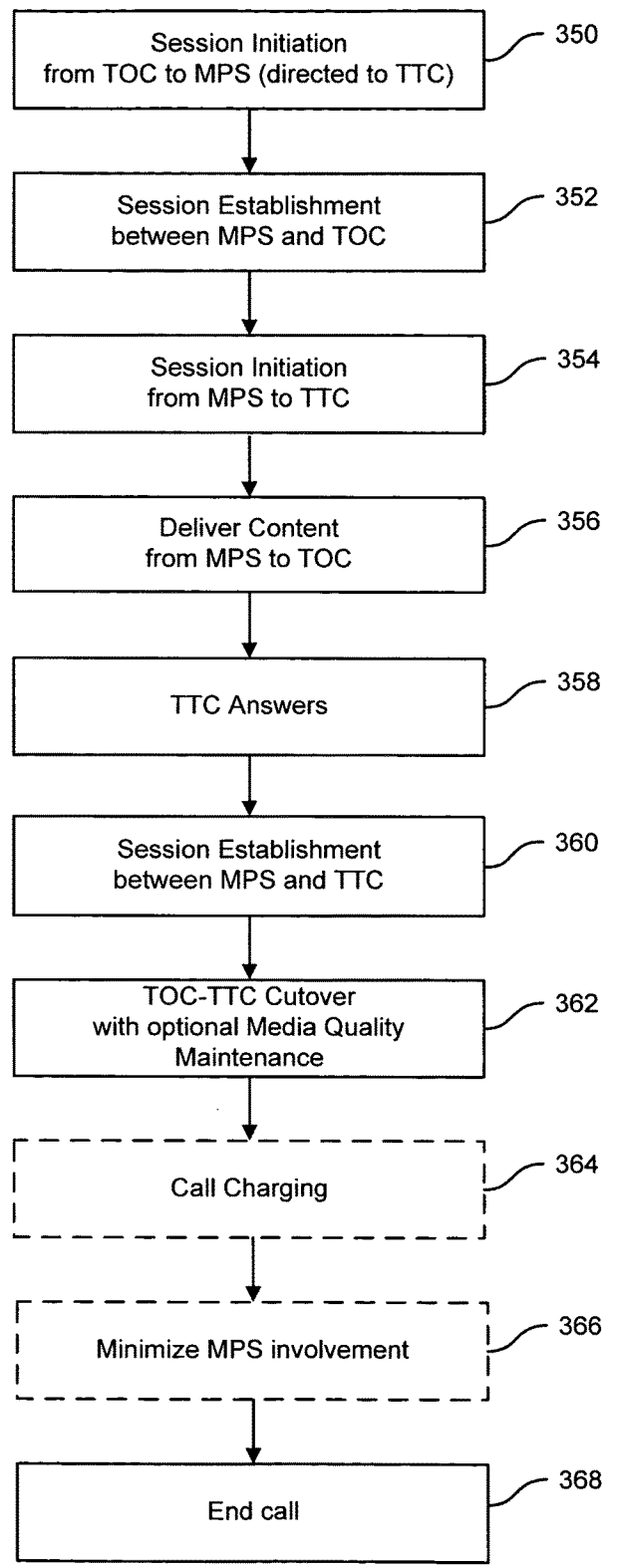
FIG. 3B is a simplified flowchart illustrating a sequence of session operations according to an embodiment of the present invention.

FIG. 3B is a simplified flowchart illustrating a sequence of session operations according to an embodiment of the present invention. Referring to FIG. 3B, session initiation (350) is performed to initiate a session between the TOC and the MPS. The call originates at TOC and is directed to TTC through the MPS. Session establishment (352) is accomplished between the MPS and the TOC. In an embodiment, session establishment (352) comprises session signaling such as Q.931.

Session initiation (354) is begun to initiate a session between the MPS and the TOC. The session initiated in step 354 will include the establishment of logical channels and other characteristics for the transmission of media between the MPS and TOC. Merely by way of example, H.324 and H.245 are utilized during session initiation. Content is delivered from the MPS to the TOC (356). As described more fully throughout the present specification, content delivered from the MPS to the TOC includes video ringback content, multi-media content, music content including music clips, personal messages, network announcements, advertising content, menus for video mail servers and portals, combinations thereof, and the like.

The TTC answers (358) and session establishment is accomplished between the MPS and the TTC (360). At this point in the call flow, sessions are established between the TOC and the MPS as well as between the MPS and the TTC. Content is being delivered from the MPS to the TOC, for example, video ringback content, and the call is ready to proceed to the delivery of session media from the TTC to the TOC.

TOC-TTC cutover with optional media quality maintenance (362) is accomplished to switch the content being delivered to the TOC from the content initially delivered in step 356 to the content provided by the TTC. As described more fully throughout the present specification, during the cutover process, the media quality to both terminals can be maintained at a predetermined level as appropriate to the particular applications.

Call charging is optionally initiated (364) and the involvement of the MPS may be minimized (366) in some embodiments. Merely by way of example, in a particular embodiment, call charging is delayed until an event occurs. In some embodiments, charging in step 364 is similar to the charging process associated with establishment of a conventional call between TOC and TTC. For example, in a video mail application, call charging is delayed until a user enters a predetermined menu selection. Thus, call charging is not initiated in this embodiment until a user takes an affirmative action agreeing to the charge. Utilizing methods and systems provided by embodiments of the present invention, it is possible to minimize the MPS involvement as described more fully throughout the present specification. The call ends after a certain period (368).

It should be appreciated that the specific steps illustrated in FIG. 3B provide a particular method of providing video ringback services according to an embodiment of the present invention. Other sequences of steps may also be performed according to alternative embodiments. For example, alternative embodiments of the present invention may perform the steps outlined above in a different order or make some of the steps optional. Moreover, the individual steps illustrated in FIG. 3B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
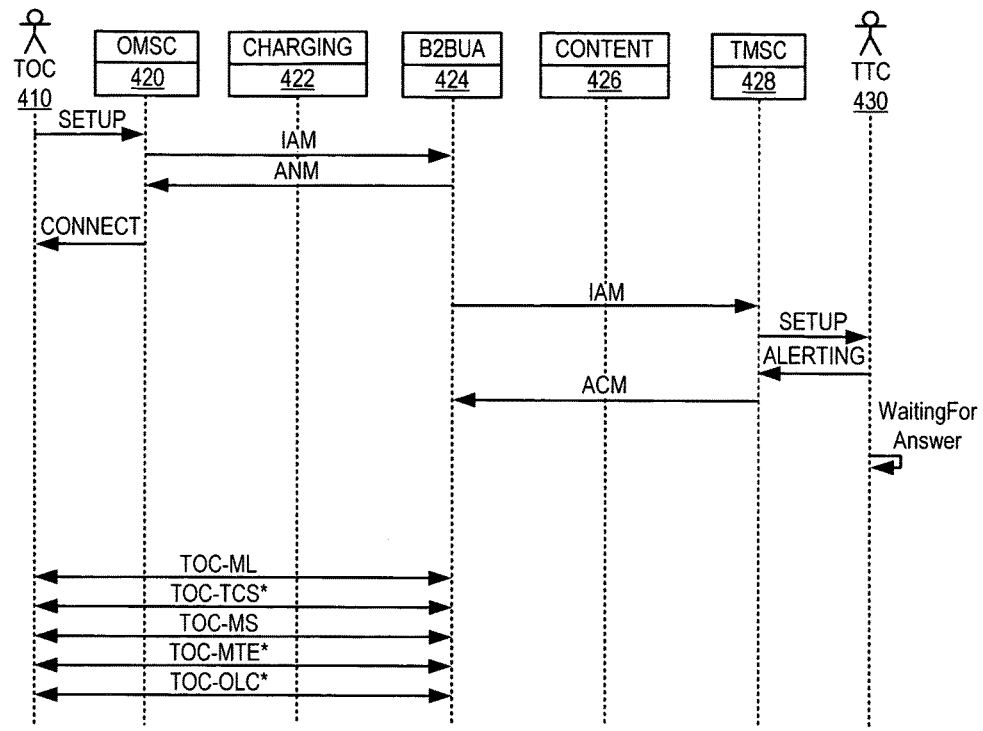
FIG. 4 illustrates session establishment for a terminal originating call and a setup request to a terminal terminating call according to an embodiment of the present invention.

FIG. 4 illustrates session establishment for a TOC and a setup request to a TTC according to an embodiment of the present invention. In an embodiment, TOC 410 is a 3G-324M terminal initiating a call set-up procedure by sending a SETUP message to OMSC 420. After receiving the SETUP message, OMSC 420 sends an ISUP Initial Address Message (IAM) to B2BUA 424. It should be noted that B2BUA 424 could be provisioned to determine if an involved subscriber has subscribed to any aspect of a configurable media offering (e.g., ringback tones). This determination could be performed by an OMSC querying the Home Location Register (HLR), not shown, and modifying the B2BUA 424 operation to become a pass through proxy. OMSC 420 could also be configured to make this subscription check, and bypass involvement of B2BUA 424 completely. Since it is possible to utilize a default subscription offering personalized content operator advertising, a bypass sequence is not shown. Thus, according to embodiments of the present invention, bypass sequences are provided as appropriate to the particular application.

B2BUA 424, returns an ISUP message ANM back to OMSC 420. OMSC 420 returns a CONNECT message to TOC 410. A communication link now exists between TOC 410 and B2BUA 424. Session characteristics for TOC-B2BUA can now be determined.

After receiving an ISUP IAM from TOC 410, which contains called party information, B2BUA 424 attempts to connect to TTC 430. An ISUP IAM is sent to TMSC 428. TMSC 428 sends a SETUP message to TTC 430 associated with the number dialled. A SETUP message informs TTC 430 of an incoming call. If TTC 430 is available TTC 430 sends an ALERTING message to TMSC 428 informing it that ringing has started. TMSC 428 sends an ISUP Address Completed Message (ACM) to B2BUA 424, indicating to B2BUA 424 that TTC 430 is now ringing and awaiting answer.

Further possibilities exist to elicit the ringing response such as a modified ACM, like an early ACM, followed by another message such as a CPG with alerting enabled. Ringing may be connected in other message flows such as when after an ISUP "early ACM" from TMSC (an ACM with no alerting indication) is followed by an ISUP CPG with an alerting indication. The gateway could also initiate the call to TOC and upon answering offer an announcement of ringback media while a second terminal, TTC, is still alerting.

As a session established between TOC 410 and B2BUA 424 may be cross-connected to a session established between B2BUA 424 and TTC 430. Session characteristics and logical channel characteristics for a session between TOC 410 and B2BUA 424 (henceforth this interface and session shall be referred to as "B2BUA-TOC," similar interfaces are addressed in a similar fashion) can be used to limit session characteristics offered from B2BUA 424 to TTC 430 and control the session characteristics for B2BUA-TTC.

The restrictions applied may include, but not be limited to, any session characteristics or logical channel characteristics, examples being: reducing maximum ML, limiting media types available, limiting codecs available (to avoid transcoding), and the like.

The session characteristic limitations for B2BUA 424 need not be limited to B2BUA-TTC. Rather, B2BUA-TOC could be limited, or modified, before any further connections to reduce the use of transcoding, and/or eliminate transcoding altogether in some cases. As an example of eliminating transcoding in 3G-324M, B2BUA 424 may limit its advertised terminal capability set (TCS) to the minimum set of mandatory capabilities in 3G-324M to TOC 410. This reduces the session to a set of minimal known characteristics, and TTC 430 will be known to be able to match these capabilities, and not require transcoding.

Figure 5:
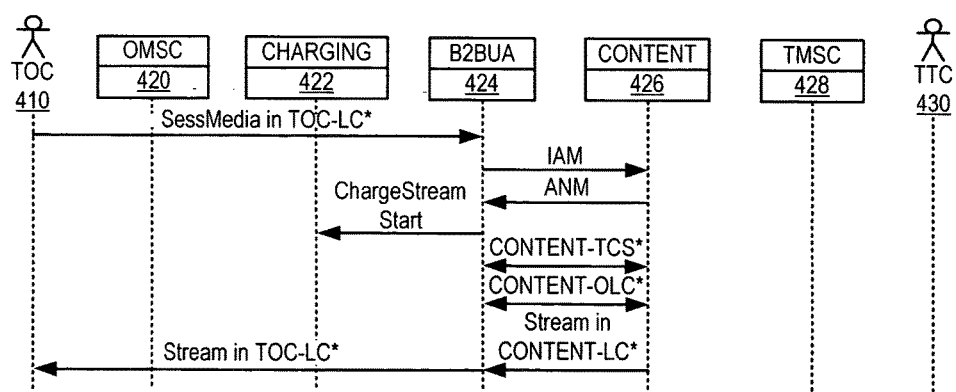
FIG. 5 illustrates the display of configurable media to a terminal originating call according to an embodiment of the present invention.

Logical channels are opened between TOC 410 and B2BUA 424 via OLC requests. After OLCs and MTEs are acknowledged by TOC 410 and B2BUA 424, media is free to flow in logical channels. As illustrated in FIG. 5 discussed below, TOC 410 may begin sending media (SessMedia in TOC-LC), after completion of sequences illustrated in FIG. 4. In PVRBT mode, B2BUA 424 may disregard TOC 410 media and in session signaling (for example video fast update) until required by cross-connect, configurable and customizable media is shown in FIG. 5 (Stream in TOC-LC*). B2BUA 424 may conceivably put disregarded media and signaling to some other use, or even provide session mixed PVRB. A returned session media mixed PVRB could be interactive, an example of which could be a simple interactive game.

FIG. 5 illustrates the display of configurable media to a terminal originating call according to an embodiment of the present invention. Referring to FIG. 5, in order to access content for PVRB to be supplied to TOC 410, B2BUA 424 may create a session connection to CONTENT 426 any time after ACM in FIG. 4. Content requests may be customized using session information, session related information, or information derived from either of these, called party information, calling party information, operator information for subscribers involved in the call, combinations of these, and the like. In the example illustrated in FIG. 5, B2BUA 424 and CONTENT 426 are shown connecting using a simplified ISUP channel-based protocol. B2BUA 424 sends an ISUP IAM to CONTENT 426. CONTENT 426 returns an ISUP Answer Message (ANM) to B2BUA 424. A charging event might be sent by B2BUA 424 to CHARGING 422 indicating a start of a streaming session for billing purposes.

A communication link now exists between CONTENT 426 and B2BUA 424. Session characteristics for CONTENT-B2BUA can now be determined. The session established between CONTENT 426 and B2BUA 424 may be cross-connected to TOC and any information regarding TOC's session or LC characteristics may be used to limit terminal session characteristics by B2BUA 424 to CONTENT 426 or as a means of selecting content that will be delivered.

The restrictions applied may include, but not be limited to, any session characteristics or logical channel characteristics, examples being: reducing maximum ML, limiting media types available, limiting codecs available (to avoid transcoding), and the like.

Logical channels are opened between CONTENT 426 and B2BUA 424 via OLC requests. After OLCs and MTEs are acknowledged by CONTENT 426 and B2BUA 424, media is free to flow in logical channels (e.g., illustrated by Stream in CONTENT-LC* in FIG. 5).

B2BUA 424 has a session to TOC 410 and a session to CONTENT 426 that it may interconnect in a variety of ways. In embodiments of the present invention providing PVRBT, B2BUA 424 connects media logical channels of CONTENT 426 and TOC 410, to allow transmission of media from CONTENT 426 through B2BUA 424 to TOC 410 (e.g., illustrated by Stream in CONTENT-LC* flowing to Stream in TOC-LC* in FIG. 5). Accordingly, PVRBT is now being displayed at TOC 410.

Figure 6:
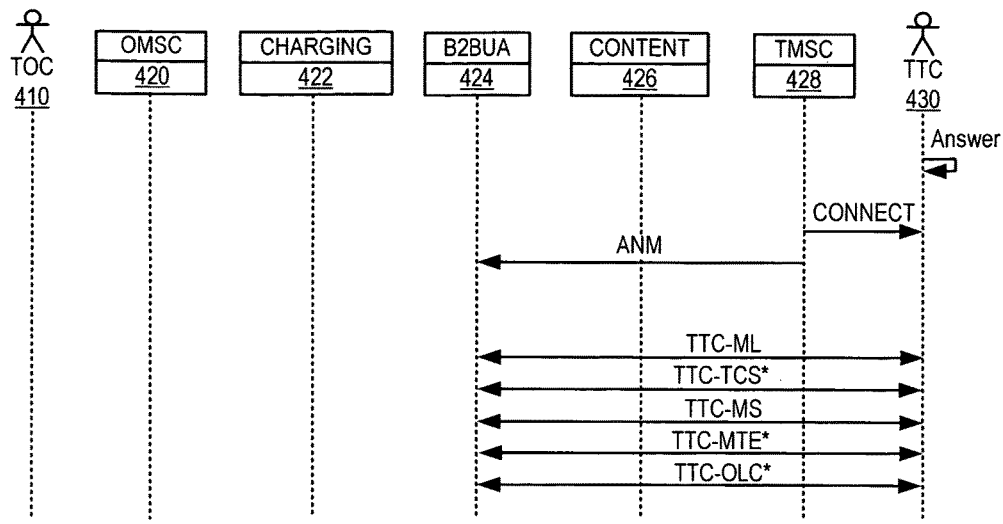
FIG. 6 illustrates session establishment for a terminal terminating call according to an embodiment of the present invention.

FIG. 6 illustrates session establishment for a terminal terminating call according to an embodiment of the present invention. Referring to FIG. 6, TTC 430 answers and a CONNECT message is sent from TTC 430 to TMSC 428. TMSC 428 then sends an ISUP Answer Message (ANM) to B2BUA 424. A communication link now exists between TTC 430 and B2BUA 424. Session characteristics TTC-B2BUA can now be determined.

The session established between TTC 430 and B2BUA 424 may be cross-connected to TTC 430, information regarding TOC's session or LC characteristics can be used to limit session characteristics between B2BUA 424 and TTC 430.

The restrictions applied may include, but not be limited to, any session characteristics or logical channel characteristics, examples being: reducing maximum ML, limiting media types available, limiting codecs available (to avoid transcoding), and the like.

Logical channels are opened between TTC 430 and B2BUA 424 via Open Logical Channel (OLC) requests. After OLCs and Multiplex Table Entry Requests (MTEs) are acknowledged by TTC 430 and B2BUA 424, media is free to flow in the logical channels (e.g., SessMedia in TTC-LC* as illustrated in FIG. 7).

Figure 7:
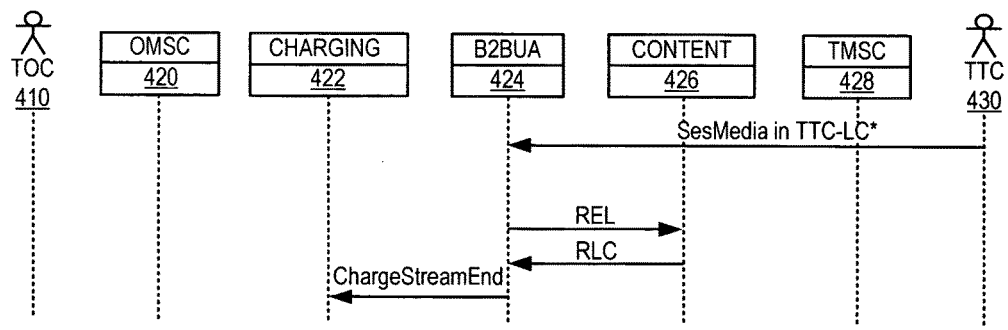
FIG. 7 illustrates a media teardown process in a non-interactive embodiment according to the present invention.

Referring to FIG. 7, initially B2BUA 424 has a session to TOC 410, a session to CONTENT 426, and a session to TTC 430 that it may interconnect in a variety of ways. In embodiments of the present invention providing PVRBT, B2BUA 424 disconnects the signaling path and media logical channels between B2BUA 424 and CONTENT 426. CONTENT 426 is disconnected by means of an ISUP Release (REL). CONTENT 426 responds with an ISUP Release Complete (RLC). A charging event might be sent by B2BUA 424 to CHARGING 422 indicating the end of TOC's streaming session for billing purposes.

Figure 8:
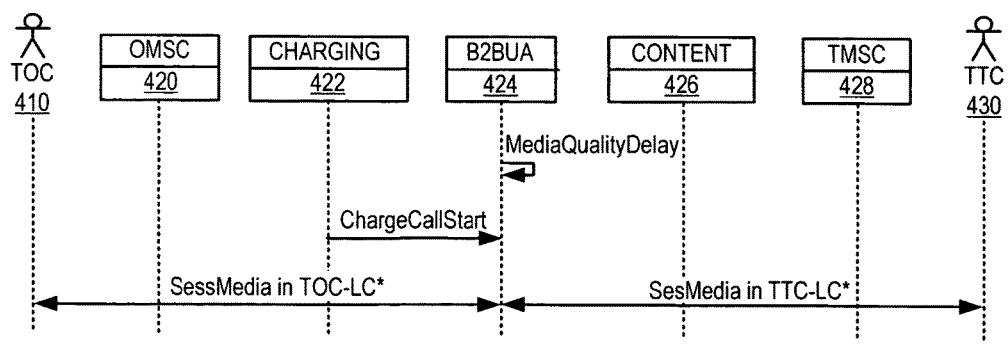
FIG. 8 illustrates session cutover according to an embodiment of the present invention.

FIG. 8 illustrates session cutover according to an embodiment of the present invention. In embodiments of the present invention providing PVRBT, following personalized ringback, B2BUA 424 connects sessions between TOC 410 and TTC 430 as illustrated in FIG. 8. A TOC-TTC cutover decision may be delayed in order to enhance media quality.

If certain features in a bitstream are desired to be received initially after cutover, then B2BUA 424 may delay connecting TOC 410 and TTC 430 (in both the TOC to TTC and the TTC to TOC directions) until these features present themselves. During any cutover delay period, the MPS may still send media to TOC in order to maximize the period of active content to the TOC user. One example of this would be not disconnecting CONTENT 426, by executing the commands in FIG. 7, until after the media cutover shown in FIG. 8, this will maintain content transmission through session setup to TTC also and provide a TOC user with longer access to the content (which may attract a premium). Temporal media quality issues will generally be present in media types with temporal compression (i.e., some form of prediction based coding such as H.263, MPEG-4 Visual, H.264 or GSM-AMR). If no action is taken, the media quality will generally be impacted detrimentally. For video, this may result in significant corruption as inter coded frames arrive at TOC or TTC when an intra coded frame is required for proper presentation of the video.

Action may also be taken to initiate terminals to send these desired features. All these actions may be performed independently for each media channel in a system, or in concert across channels, adapting for media relationship quality such as audio/video skew. A media stream may be delayed waiting upon a complementary media stream to be present or present a desired feature. For example, audio might not be transmitted until video was ready with desired features.

An exemplary use of media quality enhancement delay is to wait for a video intra-coded (or key) frame (I-frame) before transmitting video through B2BUA 424. An arrival of an I-frame can be expedited by issuing of a request (e.g., an H.245 VideoFastUpdate or similar).

According to an embodiment of the present invention, the media delay function includes an ability to detect a desired feature. For a video I-frame in some codecs (e.g., H.263) a picture start code (PSC) and frame type inside a video media bitstream are detected. Demultiplexing of data (including RTP de-packetization), followed by some media bitstream analysis, allows this detection process. Since some features may be detectable in the multiplexed form, demultiplexing is not provided in some embodiments.

According to an embodiment of the present invention, if a media gateway with local generation of desired features (e.g., a transcoding media gateway as described in US Patent Application Publication No. 2004/0252761, commonly assigned, and incorporated herein by reference for all purposes) is being used, media quality issues could be resolved without delay, or the need to wait for their arrival in the incoming bitstream. An example of this local generation is if the media gateway is transcoding, and/or decoding, an incoming video bitstream prior to a decided cutover point and maintaining a state that would allow an intra coded frame to be generated on command into an outgoing bitstream. The output need not be used, nor generated, prior to the cutover time, but upon cutover time, an intra frame is generated without delay.

It should also be noted that if a transcoding media gateway is involved, and will remain involved, fewer characteristics of a session need to be matched (i.e., media codecs and configurations do not need to match). Additionally, a subset of signaling may be cross connected rather than the entire set.

Referring to FIG. 8, B2BUA 424 has two sessions attached that it may interconnect in a variety of ways. In embodiments of the present invention providing PVRBT, a session between TOC 410 and TTC 430 is utilized and B2BUA 424 connects signaling path and media logical channels of TTC 430 and TOC 410 via retransmission. A charging event might be sent by B2BUA 424 to CHARGING 422 indicating the start of a TOC 410 to TTC 430 session for billing purposes. This charging happens at an equivalent time as for a normal TOC-TTC call, even though compared to the session establishment and services delivered to TOC it is delayed. As illustrated in FIG. 8, a session is now established between TOC 410 and TTC 430 and they may communicate as in a normal call between themselves.

B2BUA 424 need only remain in a session as far as its responsibilities require. As described more fully throughout the present specification, reducing the involvement of the B2BUA in the call provides a reduction in the amount of resources used during the call.

Figure 9:
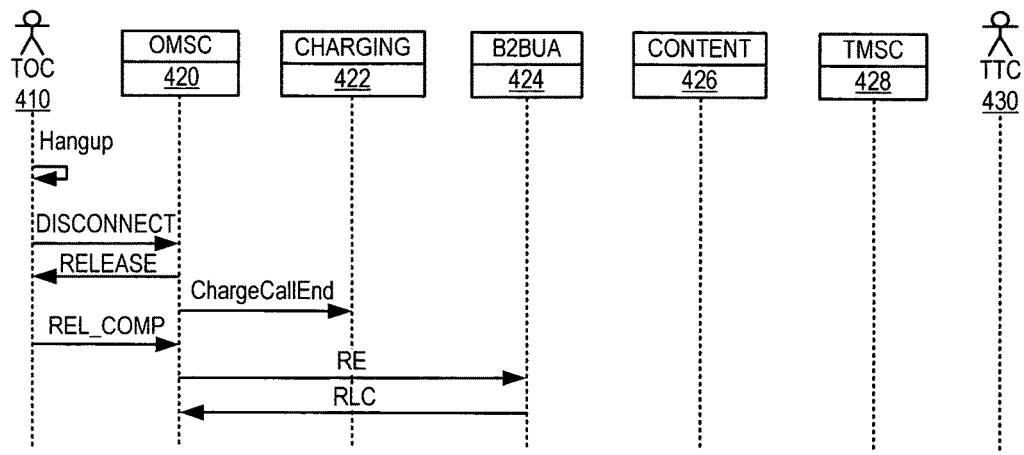
FIG. 9 illustrates session teardown from a terminal originating call according to an embodiment of the present invention.

FIG. 9 illustrates session teardown from a terminal originating call according to an embodiment of the present invention. When either terminal (e.g., TOC 410 in the sequence illustrated in FIG. 9) decides to end a session, similar steps to Steps (H1) and (H3) take place. Following Step (H3), a Call signaling DISCONNECT is sent to an MSC to which a terminal is attached (OMSC 420 in the sequence illustrated in FIG. 9). After receiving a DISCONNECT from TOC 410, OMSC 420 signals a RELEASE to TOC 410. OMSC 420 sends an ISUP RELEASE message to B2BUA 424.

A charging event might be sent by B2BUA 424 to CHARGING 422 indicating the end of TOC 410 to TTC 430 session for billing purposes. TOC 410 sends a reply RELEASE_COMPLETE message to OMSC 420 and is no longer involved in the call. On receipt of an ISUP RELEASE message from OMSC 420, B2BUA 424 sends a return ISUP RELEASE_COMPLETE message to OMSC 420. A similar treatment should be obvious to those skilled in the arts for TTC 430 disconnection cases.

Figure 10:
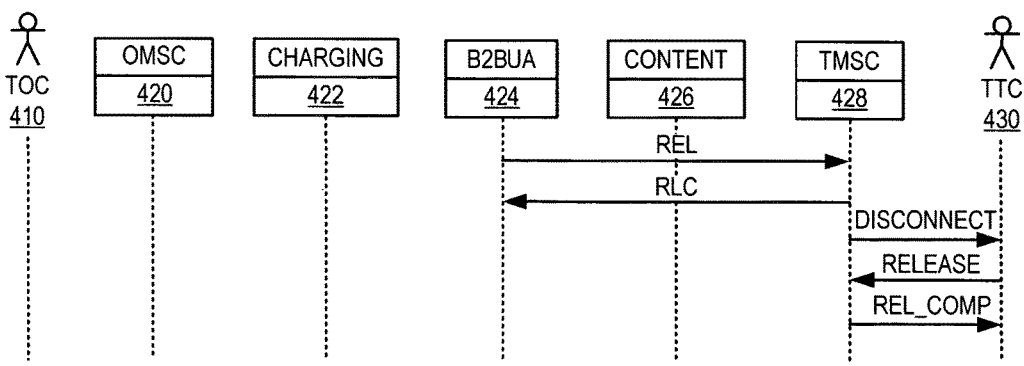
FIG. 10 illustrates session teardown propagated to a terminal terminating call according to an embodiment of the present invention.

FIG. 10 illustrates session teardown propagated to a terminal terminating call according to an embodiment of the present invention. Referring to FIG. 10, disconnection message propagation is illustrated. B2BUA 424, on receipt of an ISUP RELEASE message from OMSC 420, sends an ISUP RELEASE message to TMSC 428. TMSC 428, on receipt of an ISUP RELEASE message from B2BUA 424, sends a return ISUP RELEASE_COMPLETE message to B2BUA 424, and a DISCONNECT message to TTC 430. TTC 430 sends a reply RELEASE message to TMSC 428, which replies with a RELEASE_COMPLETE message. The call is now finished and all parties are returned to states ready to make new calls.

Content

In embodiments of the present invention providing PVRBT, such as the embodiment illustrated in FIG. 4, if TTC 430 is not available, a message with a non-availability cause code (e.g., DISCONNECT or RELEASE), will be sent to B2BUA 424. This input can serve as an input to determine content served to TOC 410. The content displayed may be a busy indication or user not available indication. Other network announcements or indication content can be displayed in a similar fashion.

Other inputs to content selection and type of personalization supplied to a terminal may be decided as a function of one or more characteristics listed in Table 3. It will be apparent that the list of characteristics provided in Table 3 is not intended to limit embodiments of the present invention and other characteristics are included within the scope of the present invention. One of ordinary skill in the art would recognize many variations, modifications, alternatives, and additions to the personalization decisions.

TABLE 3

| Characteristic | Notes |
| --- | --- |
| Identity of receiving entity | |
| Identity of originating entity | |
| Phase of call | |
| Availability of TTC | Case of busy, network and user (call waiting) allow a different content to be displayed. |
| Status of TTC | Other terminal presently in a streaming session, or interacting in an interactive streaming session. |
| The capabilities of terminals and of the CONTENT provider | Some content may not be available due to system/terminal capabilities. i.e. MPEG4-Video content where a terminal only supports H.263, in a case where no transcoding functionality is provided in MPS. If bitrate of a content and bitrate of a terminal do not match (and no transrating is supported in B2BUA). |
| Pre-provisioned subscriber preferences | |
| Network personalization factors, e.g. demographic information for selection of content | The operator may provide content based on its own criteria. This may comprise, but not be limited to, individually targeted advertisements for a specific subscriber based on demographic and/or usage information. |
| Default | In the absence of other selection criteria, default content could be selected. |

Hunting

Referring once again to FIG. 4, following an incoming call from TTC 410, B2BUA 424 initiates a call to TTC 430. The B2BUA 424 can initiate several calls to several called party numbers. This is useful in an attempt to find a targeted user at several terminals or a group of users (for example, in a call center) and only cross connect the session to a TTC that answers.

Minimizing B2BUA Involvement

Figure 11:
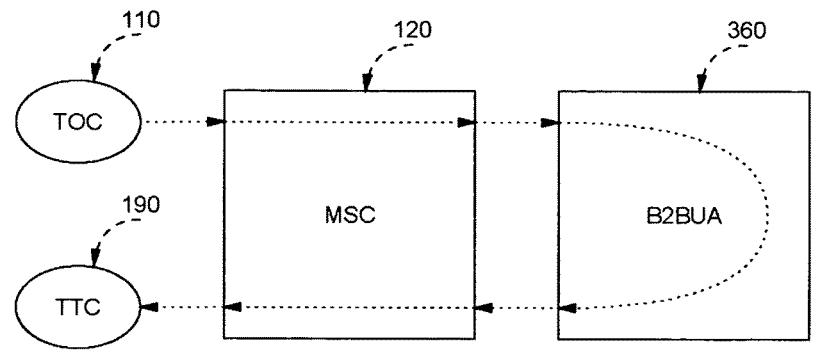
FIG. 11 illustrates a single direction media (or signaling) path according to an embodiment of the present invention.

FIG. 11 illustrates a single direction media (or signaling) path according to an embodiment of the present invention. Referring to FIG. 11, following session connection between TOC 110 and TTC 190, B2BUA 360 performs tasks including receiving and retransmitting signals and data from TOC 110 to TTC 190 and TTC 190 to TOC 110. B2BUA 360 may be involved only passively (i.e., not performing session and/or media conversions) in some aspects of transfer of session media and signaling, involvement in this exchange is a consumption of resources (memory, cycles, ports or other) in B2BUA 360 and it may be desirable to reduce consumption of these resources.

Figure 13:
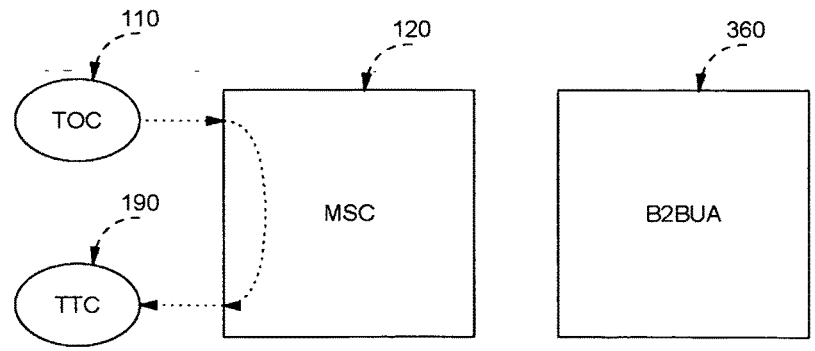
FIG. 13 illustrates a single direction media (or signaling) path with no involvement according to an embodiment of the present invention.

If session characteristics and logical channel characteristics are created at session start-up, or modified in session, in a fashion that TTC 190 and TOC 110 characteristics are matched, then B2BUA 360 may reduce its role to being a conduit for bearer data and no longer have interaction in signaling or media. By way of example, FIG. 13 shows B2BUA 360 with reduced involvement.

According to an embodiment of the present invention involving 3G-324M devices, reduced involvement includes settings such as:

1. Mobile levels (ML) of operation are the same.
2. Multiplex Table Entries (MTEs) are the same.

3. Terminal Capabilities (TCS) are the same (at least for selected features), i.e., multiplexer capabilities, and only need be non-conflicting for other features.
4. Master-slave determination (MSD) procedure outcome for TOC and TTC are different, thus allowing for handsets to resolve conflicts.
5. Logical Channels (LCs) that are open are matched so the transmitting LC for one terminal matches the receiving LC for the other terminal.

According to an embodiment of the present invention, a method to give greater control to B2BUA in negotiations with TTC is to ensure that B2BUA becomes slaved to TOC. B2BUA may then become the master to TTC, allowing B2BUA to resolve conflicts in B2BUA-TOC session characteristics with desired characteristics to allow better session characteristic matching to B2BUA-TOC.

Session characteristics could be designed to explicitly match capabilities negotiated by TOC and TTC. If matched correctly, this allows freeing of B2BUA from the call (i.e., removing B2BUA from the loop), after it has provided its service (i.e., after providing a personalized video ringback tone to TOC).

It will be appreciated that the ability to modify some session characteristics during a session is possible. Characteristics that are session-modifiable allow for non-compatible characteristics at session establishment between TOC and TTC. Prior to session cutover, these characteristics may be modified in each established session to make them match a desired set of characteristics. For example, this could be done with H.245 messages in H.324 and H.323 or Re-INVITE messages in SIP.

Figure 12:
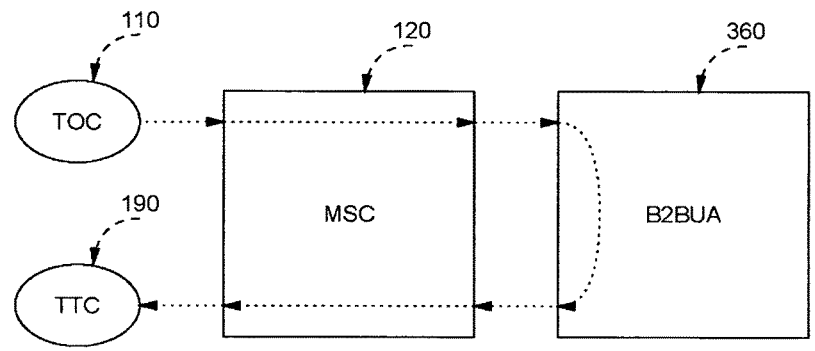
FIG. 12 illustrates a single direction media (or signaling) path with reduced involvement according to an embodiment of the present invention.

FIG. 12 illustrates a single direction media (or signaling) path with reduced involvement according to an embodiment of the present invention. Referring to FIG. 12, a technique known as hair-pinning is illustrated. In this technique, the involvement of B2BUA 360 is reduced to a direct transfer of session (bearer) data.

When involvement of B2BUA 360 is minimized to a transfer of bearer data a Release Link Trunk (RLT) can be performed to remove B2BUA 360 entirely from a call. From the personalized video ringback tone scenario an RLT would be performed during session connection (after FIG. 8). After an RLT, the session is no longer associated with B2BUA 360 (FIG. 13). Call teardown will occur as for a conventional call where B2BUA 360 is not a network element. In SIP/IMS networks RLT may be replaced with Re-INVITEs or REFERs to implement release functionality.

All possibilities between remaining completely in media and signaling paths (FIG. 11), to a complete release of channel (FIG. 13) are recognised as having utility with a trade-off between passive involvement and access to session information.

The network utilisation benefit for removing the B2BUA element from a session is obvious.

If at minimum B2BUA retains minimal access to bearer data and signaling, it also retains an ability to offer several other services outlined in further example embodiments.

Non-Terminating Party Media Supply Example

Embodiments of the present invention provide methods and systems in which media is supplied to a non-terminating party. After a terminal disconnects, in any fashion, B2BUA may stream media content to terminal that did not disconnect as B2BUA has an ability to independently terminate TOC-B2BUA and TTC-B2BUA. An example use for this would be to send advertisement or announcements from an operator.

Referring once again to FIG. 9, an illustration is provided that shows TOC 410 terminating a session and being released by B2BUA 424. B2BUA 424 has options for disconnection of TTC 430. These options include immediately propagating a termination to TTC 430 and ending the call. This option is illustrated in FIG. 10. Another option is to not propagate a termination to TTC 430 and instead set up a streaming session to the non-terminated party. This option is similar to FIG. 5 for TTC 430. The duration of a streaming session may be a fixed period, based on an interactive event, or indefinite.

If a fixed period is employed, a termination will be sent after a content is displayed. This example is illustrated by the sequence illustrated in FIG. 7 followed by FIG. 10. If indefinite streaming, a streaming session is allowed to continue indefinitely and only when a terminal performs its hang-up is this termination released. This example is illustrated by the sequence shown in FIG. 9 with TTC 430 terminating followed by B2BUA 424 as shown in FIG. 7. By way of example, an indefinite period would most likely only be used when a terminal being held in session is an interactive agent capable of terminating a call. Of course, other options are included in the scope of embodiments of the present invention.

Non-Originating Party Media Supply Example

Other embodiments of the present invention provide methods and systems in which media is supplied to a non-originating party. For example, after the sequence illustrated in FIG. 6, it is possible to add a modification to the sequence shown in FIG. 5 that supplies media to TTC 430 instead, or in addition to, TOC 410. Content could be self personalized content, advertising or interactive content, and the like. Of course, the content is not limited to these examples.

Streaming to TTC 430 may create a situation where both users have personalized content being streamed to them. An example usage of this approach might be a free call system, where advertisement is supplied to users for a predefined time at call start-up.

Referring to FIG. 7, after a cutover decision is made, B2BUA 424 executes a REL command. Further, a process based on one or modifications to the sequence shown in FIG. 7 for terminating TTC 430 stream is inserted after FIG. 5. FIG. 8 is then entered and continued as per normal PVRBT call flow.

Interactive Media Supply Example

As B2BUA 424 sets up sessions to TOC 410, TTC 430, and CONTENT 426, it is not restricted to connect CONTENT 426 uni-directionally to the terminals. An ability to create interactive streams arises by opening both ends of a session, such that terminals can interact with CONTENT entity 426 via B2BUA 424, B2BUA 424 may interact with CONTENT 426 based on script, or B2BUA 424 may act as a proxy for user commands issued in media streams such as voice recognition, or video action recognition.

B2BUA 424 could act as an intermediary, offering translational services, or CONTENT server 426 could be an interactive entity itself, capable of responding directly to terminal requests proxied through B2BUA 424. Several non-limiting examples are provided: (A) CONTENT 426 as an H.324-like terminal that is capable of receiving inputs as user input indications (H.245 UII) to modify its behaviour; and (B) CONTENT 426 as an RTSP-like terminal that is capable of receiving inputs as RTSP-like controls. B2BUA 424 may then provide a mapping of user input indications UII to RTSP controls.

User interactions could be used to select content, modify content playback behaviour, interact with advertising, and/or play interactive games. For both cases, the input meanings for an interaction could either be pre-shared or shared as part of a session.

If an interaction has taken place with a terminal, B2BUA 424 may decide to delay any session cutovers. If a client has interacted with a stream, they could be given time to finish their interaction and not be interrupted. Personalization to the other entity could be introduced at this point, to cover an interaction period.

Other embodiments of the present invention provide for periodic interruption of the media supply. If B2BUA retains involvement in a call, B2BUA may be used to interrupt media sessions of any of users involved, and replace content of a session with a configurable media stream. An example use of this embodiment is for a free call session, where users are not directly paying for service, but instead pay indirectly for service by viewing advertisements according to a pre-defined contract.

By way of example, interruptions could be preceded by indications using mixed content indicators, to allow a terminal's user to prepare for the interruption and enhance a user's experience.

Session Media Mixed Media Supply Example

Figure 14:
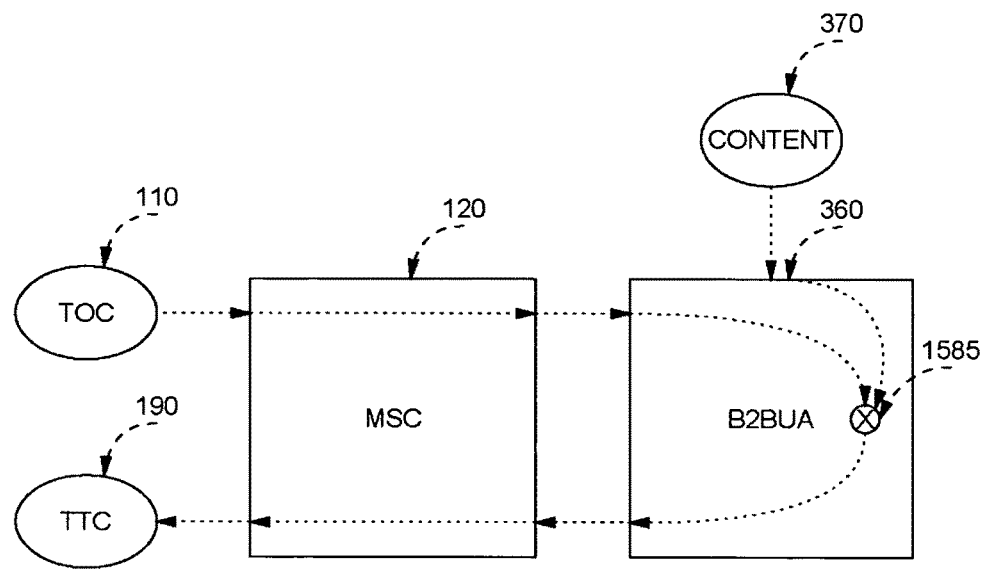
FIG. 14 illustrates a single direction media path with content mixing according to an embodiment of the present invention.

FIG. 14 illustrates a single direction media path with content mixing according to an embodiment of the present invention.

In addition to the previously described examples, embodiments of the present invention supply session media in the form of mixed media. For example, if B2BUA 360 retains involvement in a call, B2BUA 360 may be used to provide a mixed content (themed) session. Content is provided by content server 370. As shown in FIG. 14, a media and/or signaling flow is illustration in which, during interaction, some part of, or all, session media could form a part of streamed and interactive content. The mixing element is illustrated by element X (1585) in FIG. 12.

In its simplest form, replacement or adjunct channels could be supplied by B2BUA 360 inside a more capable network for people dialling in from, or roaming into, single media only networks (or otherwise capable networks). As an example, VOIP, 2G (including 3G subscribers in 2G coverage) or PSTN clients may negotiate through a gateway with a 3G network and establish a voice only call. B2BUA 360 could offer a range of solutions to a user's lack of visual presence.

A replacement stream may be a non-descript silhouette, static image, any kind of video, and may or may not be related to the calling party. The called party and operator information can also be used to determine content type.

A stream may also be an avatar, a computer generated representation, possibly personalized (e.g., as discussed in U.S. Pat. No. 6,559,845), representing a calling party that is designed to move its mouth in time with an audio only signal.

As will be evident to one of skill in the art, adjunct channels are not limited to augmenting video only, but include replacement of any missing media, or logical channel, or other features as available.

A significant enhancement to user experiences is produced by the use of mixing technologies, where a media signal between the terminals is no longer simply proxied or generated. Instead, media from a session would be mixed according to some pre-configured rule set with configurable content.

An example would be picture in picture during an advertisement, where either session media or an advertisement media takes on reduced scope (for example down-sampling by 2 in both directions) and may superimposed on the other media.

Another example is the use of mixed media in conjunction with periodic interruption, whereby an alerting indicator alerts the user that a periodic advertisement is about to appear. Examples include a beeping tone in audio and/or fading video.

Other possibilities in this mixing domain include supplying complete media of a user but augmented with configurable media. One non-limiting possibility is a theme for a user environment, whereby a frame could be added to picture media and other ambient noises could be added as well. Further to this example, framed media could be a motion rendition of a rainforest; with low level ambient noises from a rainforest scene. Further, a frame need not be limited to displaying session media directly in windowed fashion, but instead could be interacted whereby occasionally an element of a theme could interpose itself on session media, such as a bird flying across, or a lizard walking across the screen. This could be designed such that both terminals receive the same mixed-in events, and might be useful in walk throughs of a scene, i.e., a real estate agent walking a client through a pre-recorded filming session of a house.

Figure 15:
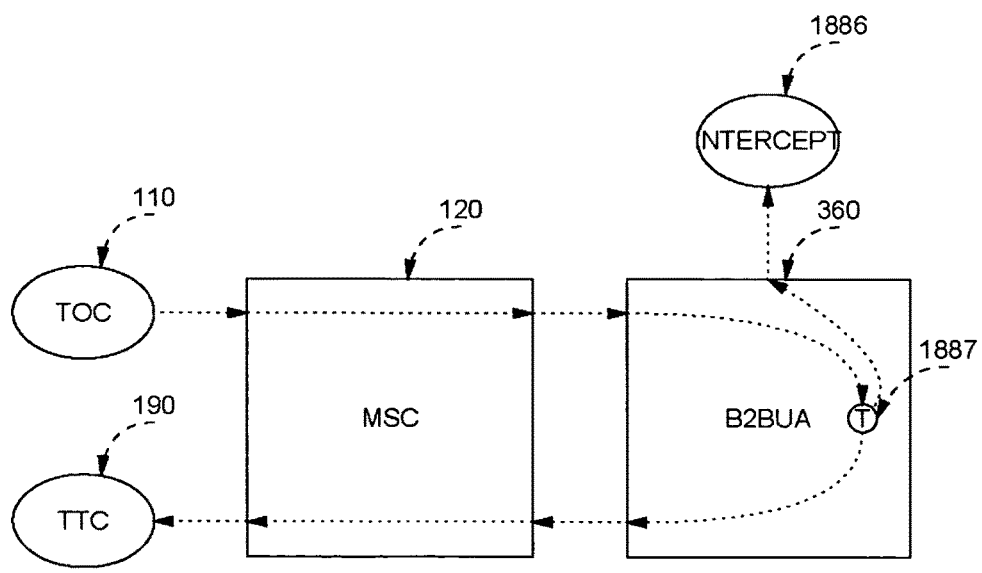
FIG. 15 illustrates a single direction media (or signaling) path being intercepted according to an embodiment of the present invention.

Embodiments of the present invention provide methods and systems that include session media intercept. FIG. 15 illustrates a single direction media (or signaling) path being intercepted according to an embodiment of the present invention. If B2BUA 360 remains entirely in media and signaling paths, media-based analysis and capturing (e.g., lawful intercept) is possible. FIG. 15 introduces an INTERCEPT entity 1886 and a tap point, T 1887. INTERCEPT 1886 could be an entity supporting a standard video telephony protocol, e.g., SIP, H.323 or RTSP (with record). A session could be opened from B2BUA 360 to INTERCEPT 1886 when a session of interest is present. The session will be intercepted as allowed by legal authority according to an embodiment. Determining that a session of interest is present uses such information as calling party and called party. In an embodiment, all streaming media and session signals are sent to INTERCEPT device 1886, either for saving and later retrieval, or for real time analysis.

Figure 16A:
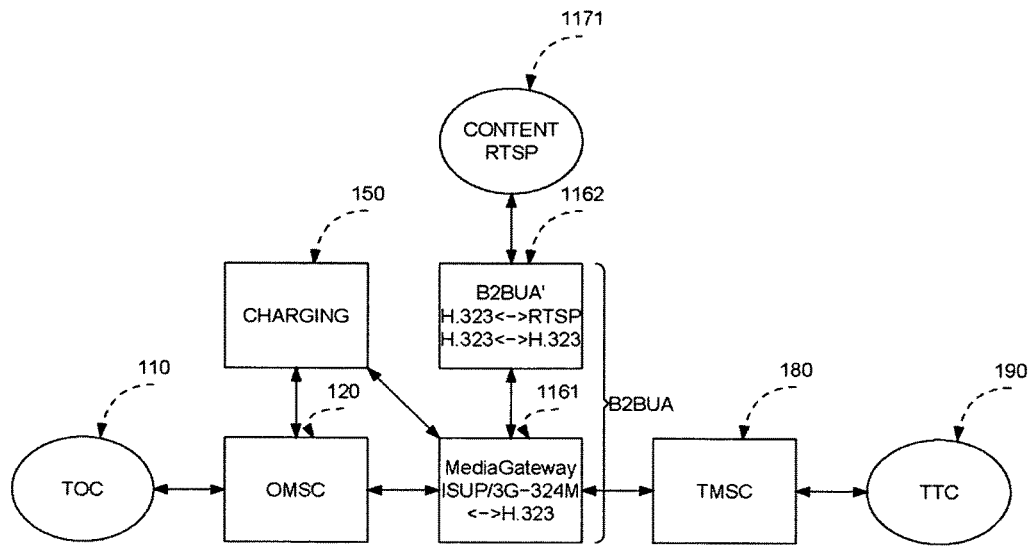
FIG. 16A illustrates another connection architecture for MS-to-MS H.324 calls using IP content according to an alternative embodiment of the present invention.

FIG. 16A illustrates another connection architecture for MS-to-MS H.324 calls using IP content according to an alternative embodiment of the present invention. In the example illustrated in FIG. 16A, an alternate network placement is shown. FIG. 16A shows an exemplary embodiment with an entity offering services similar to MSP created from an ISUP to H.323 transcoding media gateway and externally coupled with a H.323 to H.323 or RTSP switching gateway. It should be noted that the H.323 to H.323 or RTSP switching gateway is a further embodiment of the invention (B2BUA') that operates with H.225.0-Q.931 signaling and RTP media in conjunction with the H.323 protocol. The further embodiment, and similar embodiments, can be coupled with a media gateway to offer MSP features across protocol boundaries without recreating all components in a given protocol domain.

Figure 16B:
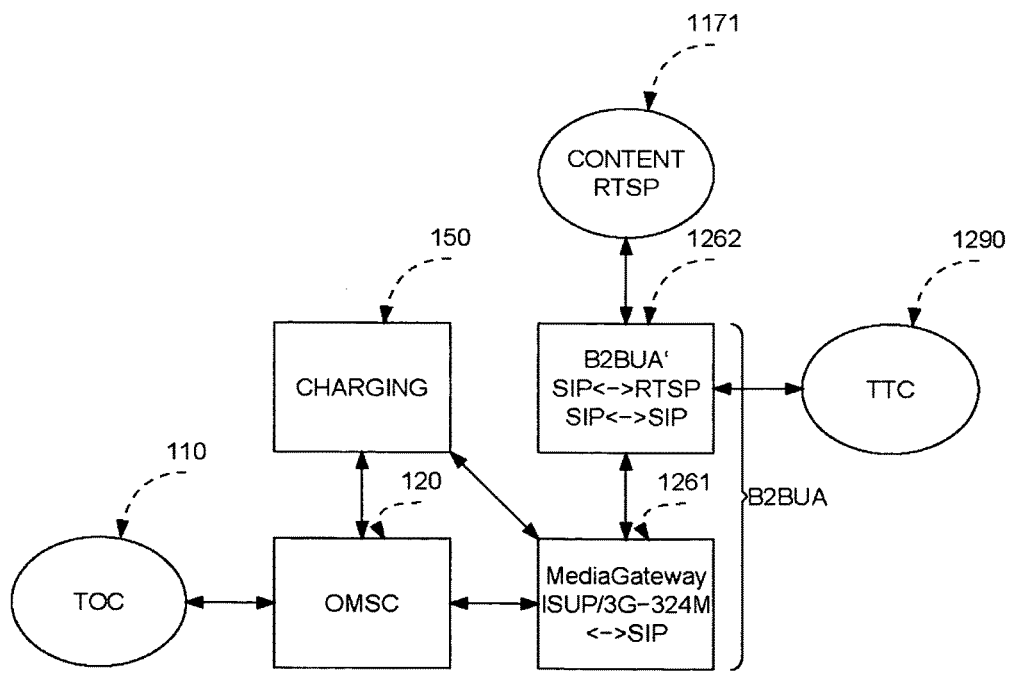
FIG. 16B illustrates an alternative connection architecture for MS H.324-to-SIP calls using IP content according to another embodiment of the present invention.

FIG. 16B illustrates an alternative connection architecture for MS H.324-to-SIP calls using IP content according to another embodiment of the present invention. The implementation illustrated in FIG. 16B shares some commonalities with the implementation illustrated in FIG. 16A. In FIG. 16B, a session connection is established between B2BUA' 1262 and TTC 1290. A benefit provided by the implementation illustrated in FIG. 16B is that content, for example, video ringback content, may be delivered to a H.324 device, for example, a 3G-324M terminal or device in communication with a SIP device.

Figure 17:
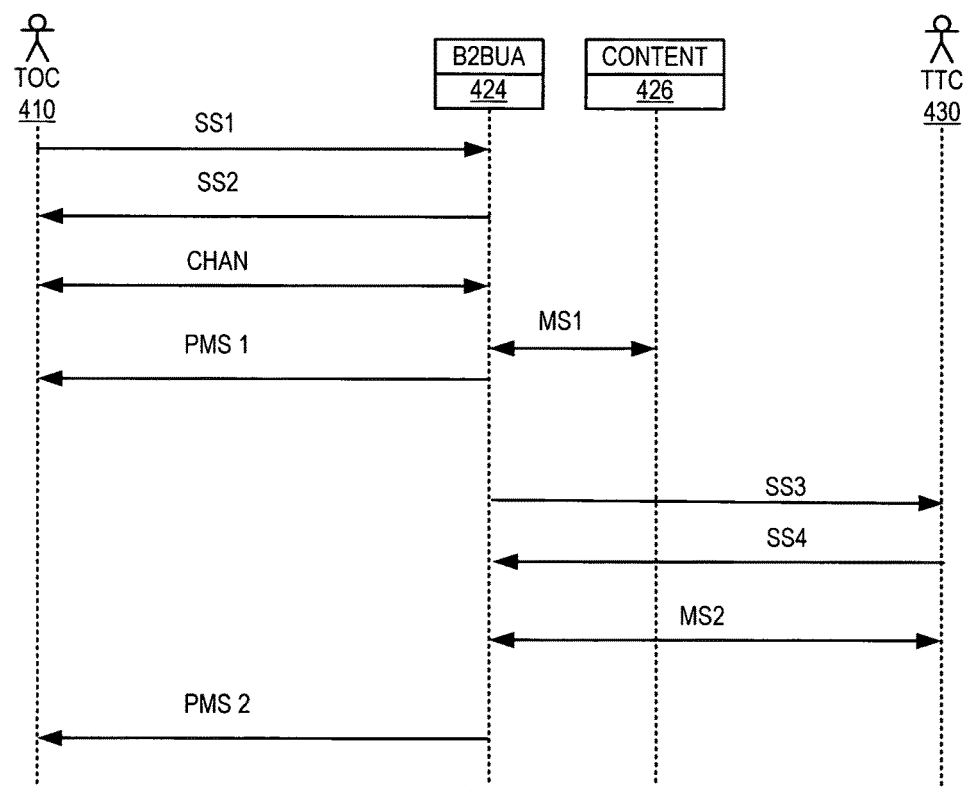
FIG. 17 illustrates session establishment and content delivery for a terminal originating call followed by session media delivery according to an embodiment of the present invention.

FIG. 17 illustrates session establishment and content delivery for a terminal originating call followed by session media delivery according to an embodiment of the present invention. TOC 410 transmits a first session signaling message to B2BUA 424. In an embodiment, the TOC 410 is an H.324-like terminal such as a 3G-324M handset. The B2BUA 424 provides the functionality of a media server in the embodiment illustrated in FIG. 17. A second session signaling message is transmitted from B2BUA 424 to TOC 410. Following the first signaling message and the second signaling message, one or more channels are established between TOC 410 and B2BUA 424.

A first media stream is established between a content device (CONTENT 426) and B2BUA 424. In an embodiment, CONTENT 426 is a media streaming server, such as an RTSP server, having one or more memories. Utilizing media stored in the content server 426 and the first media stream, B2BUA functions as a media server, processing the first media stream to form a first processed media stream. The first processed comprises a ringback media stream according to an embodiment. The first processed media stream, for example, a ringback media stream, is transmitted from B2BUA 424 to TOC 410 using the one or more channels previously established.

As illustrated in FIG. 17, a third session signaling message is transmitted from B2BUA 424 to TTC 430, which is a second terminal in some embodiments, for example, an H.324 device, a 3G-324M device, or a SIP device. A fourth session signaling message is transmitted from TTC 430 to B2BUA 424 and a second media stream is established between TTC 430 and B2BUA 424. In an embodiment, media transmitted from TTC 430 is processed by B2BUA 424 to form a second processed media stream, which is transmitted from B2BUA 424 to TOC 410. The second processed media stream may be transmitted from B2BUA 424 to TOC 410 using the one or more channels previously established.

It should be appreciated that the specific steps illustrated in FIG. 17 provide a particular method of providing content delivery, for example, video ringback services, according to an embodiment of the present invention. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

The temporal position of the session signaling messages is determined in embodiments of the present invention as appropriate to the particular applications. In a first example, SS2 could precede SS1 if B2BUA is initiating the call. Likewise, SS3 could precede SS1 or be sent concurrently with SS1 if B2BUA was initiating the connection with TTC prior to or concurrently with the connection to TOC. SS3 could also occur at times prior to or after SS1 in other embodiments. Thus, the temporal order illustrated in FIG. 17 is provided merely by way of example. Depending on the particular applications, the temporal order of the various session signaling messages will vary as appropriate. One of ordinary skill in the art would recognize many variations, modifications, and alternatives.

Figure 18A:
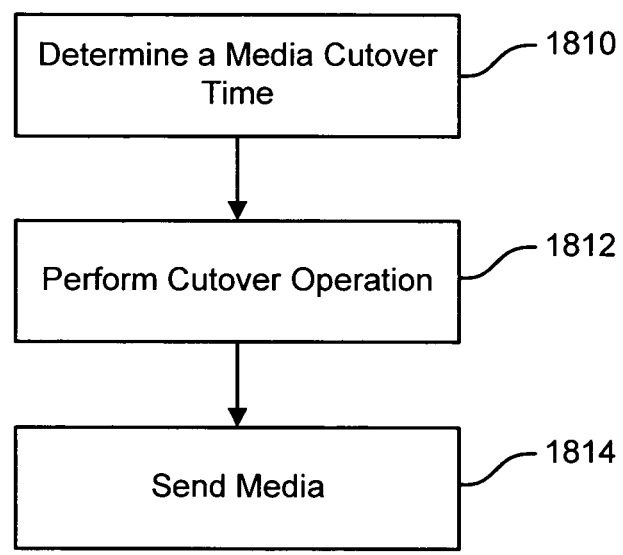
FIGS. 18A-D illustrate methods of performing media cutover according to embodiments of the present invention.

FIGS. 18A-D illustrate methods of performing media cutover according to embodiments of the present invention. At a certain time, the MPS will be operated to perform a cutover operation, delivering a second media stream to the TOC in place of a previously delivered media stream. For example, the content in a video ringback message could be replaced by session media received at the MPS from the TTC. Referring to FIG. 18A, a media cutover is determined (1810) and a cutover operation is performed (1812). Media is sent from the MPS to the TOC (1814). In the embodiment illustrated in FIG. 18A, the media is sent without certain desired features as described more fully throughout the present specification and more particularly below.

Figure 18B:
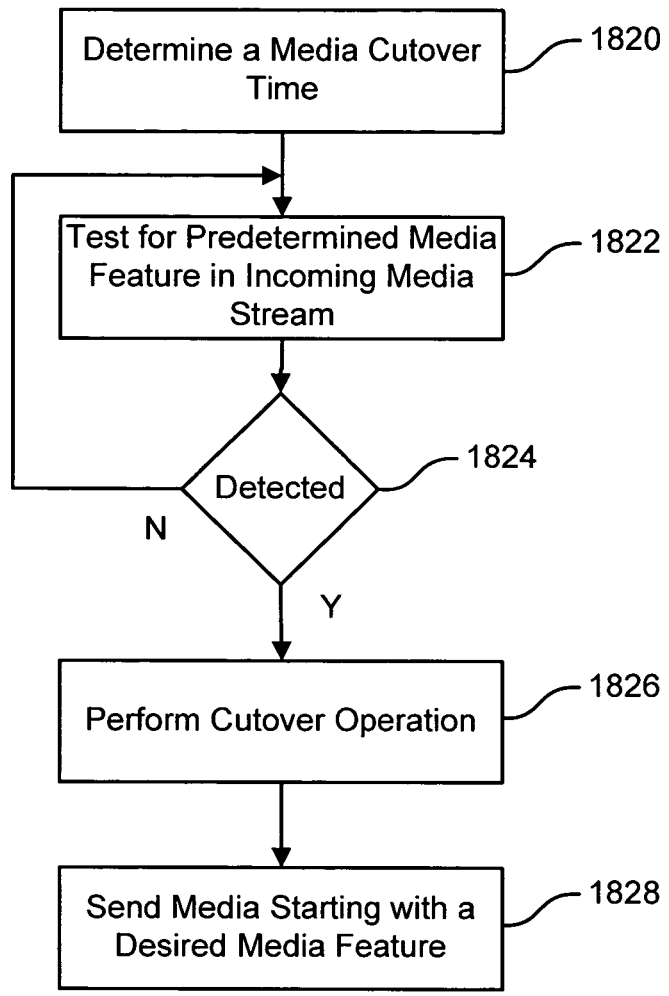

Referring to FIG. 18B, a media cutover time is determined (1820). A test is performed to determine if a predetermined media feature is present in an incoming media stream (1822). In an embodiment, the predetermined media feature includes a temporal media feature. As an example, temporal media features include an intra-coded frame (I-frame). If the predetermined media feature is present in the incoming media stream, media cutover is performed (1826). As shown in step 1828, the cutover is initiated starting with a desired media feature. According to embodiments of the present invention, the desired media may be an I-frame encoded for the outgoing media type. Thus, the desired media feature may be the originally detected incoming I-frame or a modified (e.g., transcoded) version of the incoming I-frame.

If, on the other hand, the predetermined media feature is not present in the incoming media stream, the process returns to step 1822 and testing for the predetermined media feature is continued.

In comparison with the process illustrated in FIG. 18A, the step of sending media (1828) illustrated in FIG. 18B is thus delayed in some embodiments to provide an output media stream with improved quality, among other benefits. As discussed more fully throughout the present specification, the cutover from ringback media to session media is performed after detection of the predetermined media feature (e.g., an I-frame) in order to provide temporal features utilized by the TOC to decode the media streams. One of ordinary skill in the art would recognize many variations, modifications, and alternatives.

Figure 18C:
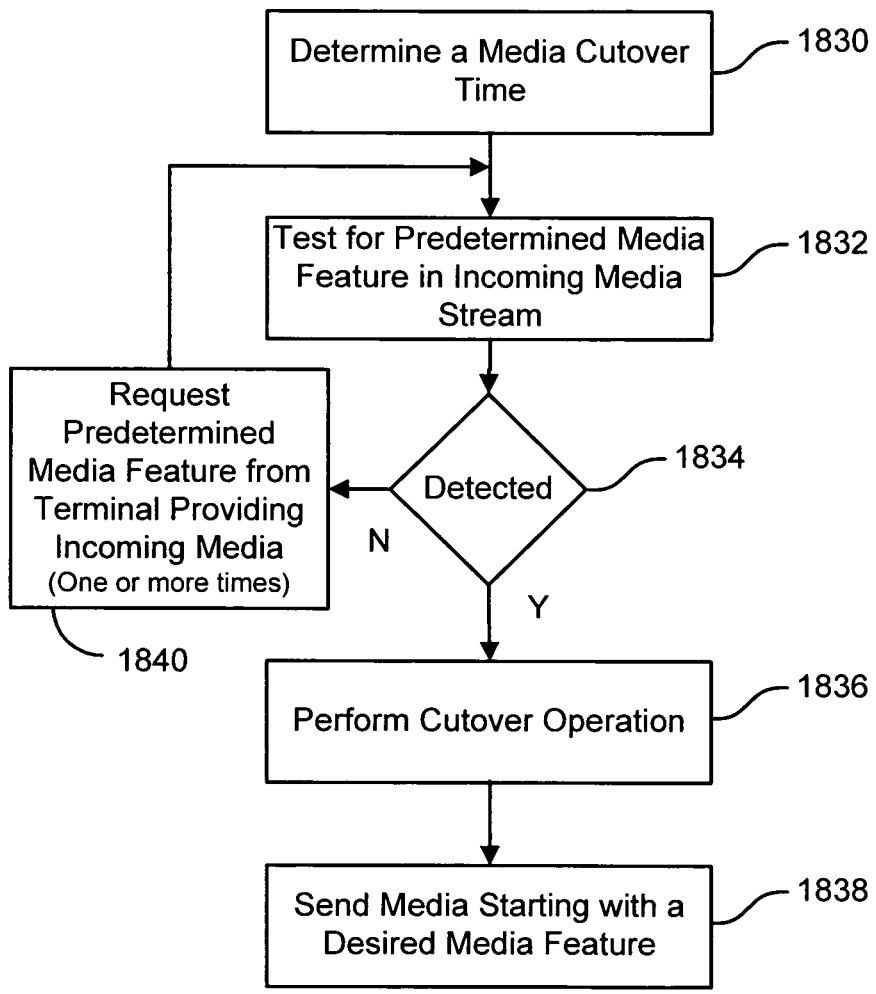

Referring to FIG. 18C, similar processes (1830, 1832, 1836, and 1838) are performed as discussed in relation to FIG. 18B. If the predetermined media feature is not present in the incoming media stream, a request for the predetermined feature (1840) is made to the TTC. The request may be made a single time or repeated a number of times. In a particular embodiment, the request is repeated a number of times at a predetermined frequency. Subsequently, the process returns to step 1832, i.e., testing for the predetermined media feature.

Figure 18D:
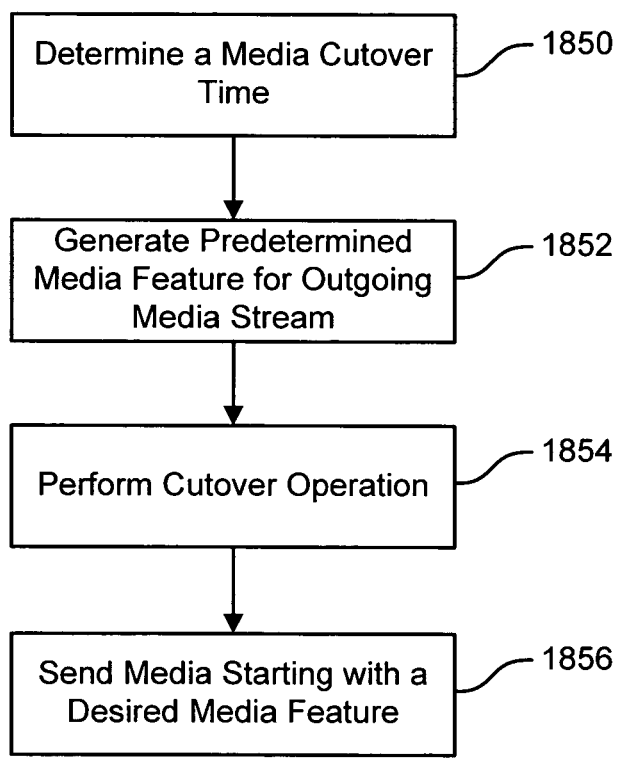

Referring to FIG. 18D, a media cutover time is determined (1850). In the embodiment illustrated in FIG. 18D, the MPS contains an ability to locally generate a predetermined media feature (1850). Thus, the method illustrated in FIG. 18D does not need to wait to receive the predetermined media feature, either passively or based upon a request sent by the MPS. Rather, with a reduced or no delay, the predetermined media feature is generated for use in the cutover operation. Once a desired media feature has been generated, the cutover operation is performed (1854) and the media is sent to the TOC starting with the desired media feature. The desired media feature is an I-frame in some embodiments in which the predetermined media feature comprises a temporal media feature. In a particular embodiment, the predetermined media feature is the same as the desired media feature, for example both are I-frames.

It should be appreciated that the specific steps illustrated in FIGS. 18A-D provide a particular method of performing cutover operations (media replacement) according to an embodiment of the present invention. Other sequences of steps may also be performed according to alternative embodiments. For example, alternative embodiments of the present invention may perform the steps outlined above in a different order. Moreover, the individual steps illustrated in FIGS. 18A-D may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 19:
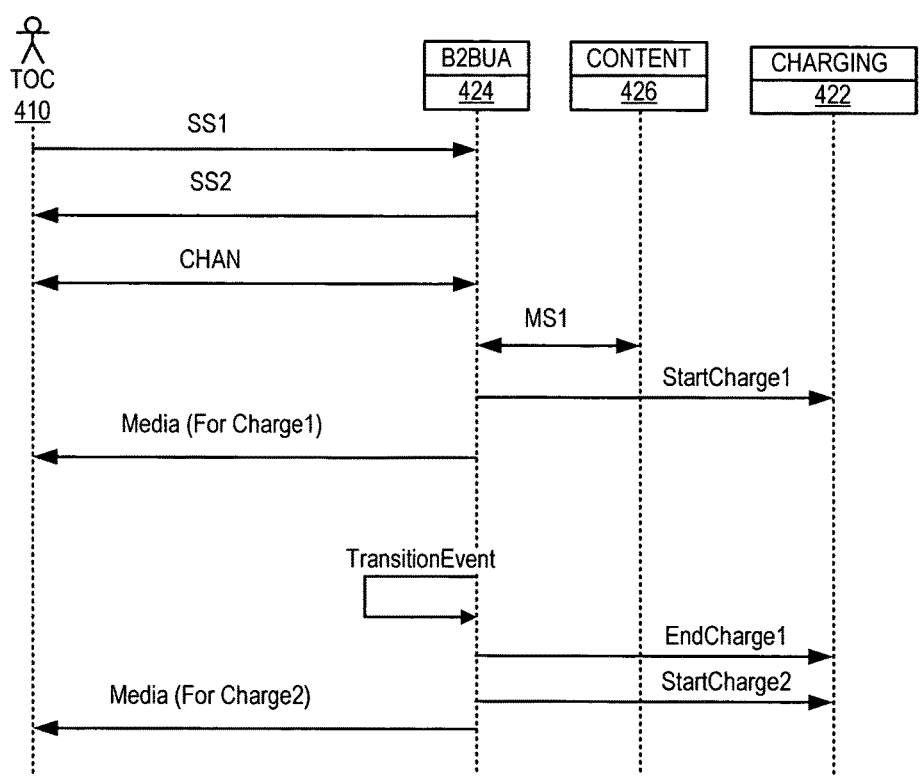
FIG. 19 illustrates session establishment, content delivery, and charging for a terminal originating call according to an embodiment of the present invention.

FIG. 19 illustrates session establishment, content delivery, and charging for a terminal originating call according to an embodiment of the present invention. TOC 410 transmits a first session signaling message to B2BUA 424. In an embodiment, the TOC 410 is an H.324-like terminal such as a 3G-324M handset. The B2BUA 424 provides the functionality of a media server in the embodiment illustrated in FIG. 17. A second session signaling message is transmitted from B2BUA 424 to TOC 410. Following the first signaling message and the second signaling message, one or more channels are established between TOC 410 and B2BUA 424.

A first media stream is established between a content device (CONTENT 426) and B2BUA 424. In an embodiment, CONTENT 426 is a media streaming server, such as an RTSP server, having one or more memories. A call charging message (StartCharge1) is transmitted from B2BUA 424 to CHARGING 422 associated with establishment of the first media stream. Media related to Charge1 is transmitted from B2BUA to TOC. Thus, the initiation of the charging process for the media associated with Charge1 accompanies the delivery of such media. As an example, for video ringback applications, a first predetermined charge will be associated with some media (for example, premium content) and a second predetermined charge (e.g., a reduced charge) will be associated with other content. Additionally, the charge for media associated with Charge1 may be based on the temporal length of the media (e.g., longer or shorter video clips). For subscribers with monthly service plans, the value charged for the StartCharge1 and EndCharge1 messages may be reduced or zero in comparison with other subscribers and in some embodiments, the StartCharge1 and EndCharge1 messages may not exist. Other variations, modifications, and alternatives to the charging structures will be evident to one of skill in the art.

The transition event (TransitionEvent) is generally associated with media cutover or user activity. As an example, answering of a call by the TTC may result in a transition event. Additionally, menu interactions in video mail or portals may trigger a transition event. EndCharge1 is typically associated with the transition event and results in the termination of charging associated with the Charge1 period. As illustrated in FIG. 19, StartCharge2 is also associated with the transition event. Media associated with Charge2 is transmitted from B2BUA 424 to the TOC as shown. Merely by way of example, during a video ringback application, the media associated with Charge2 could be media transmitted from the TTC or other entity.

As illustrated in FIG. 19, methods and systems provided according to embodiments of the present invention provide the ability to delay charging associated with session establishment and media or content delivery to a terminal. Thus, session establishment may be accomplished, along with appropriate charging, before the transition event, for example, the answering of the call by a called party. Content delivered prior to answering can thus have associated charging, while content delivered after answering can have a different charging process. Charging may coincide with other messages in this or other call flows present in the network. For example, charging may be related to the transition event associated with a Q.931 CONNECT from TTC or an ISUP ANM, which may be a single message.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. For example, the functionality above may be combined or further separated, depending upon the embodiment. Certain features may also be added or removed. Additionally, the particular order of the features recited is not specifically required in certain embodiments, although may be important in others. The sequence of processes can be carried out in computer code and/or hardware depending upon the embodiment. Of course, one of ordinary skill in the art would recognize many other variations, modifications, and alternatives.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of delivering a video ringback media stream to a first terminal, the method comprising:
 receiving a session signaling message from the first terminal capable of displaying audio and video, wherein the session signaling message initiates a procedure for call-set up with a second terminal, and wherein the second terminal is different from the first terminal;
 establishing one or more channels for receiving ringback media at the first terminal;
 receiving terminal video capability information corresponding to the first terminal;
 establishing one or more media streams between a content device and the first terminal;
 processing the one or more media streams in the content device to form a video ringback media stream for the delivery to the first terminal using the one or more channels;
 commencing presentation of video content within the video ringback media stream at the first terminal;

receiving terminal video capability information corresponding to the second terminal; and reducing an involvement of a ringback server from a level associated with call establishment;

wherein reducing the involvement of the ringback server comprises reducing a capability of the ringback server to that of a bearer conduit;

wherein the steps of (i) receiving terminal video capability information from the first terminal and (ii) commencing presentation of the video content within the video ringback media stream at the first terminal, occur prior to receiving terminal video capability information from the second terminal; and further wherein the first terminal is a 3G-324M terminal and the call set-up from the first terminal is a 3G-324M call.

2. The method of claim 1 further comprising receiving a second session signaling message from the ringback server at the second terminal, wherein a response to the second session signaling message is received after establishing the one or more channels.

3. The method of claim 2 wherein the second session signaling response message is received after commencing transmission of the video ringback media stream.

4. The method of claim 1 further comprising:
establishing one or more second media streams between the second terminal and the ringback server;
processing the one or more second media streams in the ringback server to form one or more second processed media streams; and
transmitting the one or more second processed media streams from the ringback server to the first terminal using the one or more channels.

5. The method of claim 4 wherein the ringback server comprises a media gateway, the media gateway being adapted to:
convert a first protocol used by the content device into a second protocol used by the first terminal; and
convert a third protocol used by the second terminal into the second protocol used by the first terminal; wherein:
the first protocol is selected from the group consisting of RTSP-like and SIP-like protocols;
the second protocol comprises an H.324-like protocol; and
the third protocol is selected from the group consisting of H.324-like and SIP-like protocols.

6. The method of claim 1 wherein the first terminal and the second terminal comprise H.324-like terminals.

7. The method of claim 6 wherein establishing one or more channels comprises utilizing H.324 techniques.

8. The method of claim 7 wherein the H.324 techniques comprise H.245 techniques.

9. The method of claim 7 wherein the one or more channels comprise one or more logical channels.

10. The method of claim 7 further comprising receiving a custom message associated with establishing the one or more channels from the first terminal at the ringback server prior to receiving an H.245 message from the first terminal at the ringback server using a control channel.

11. The method of claim 1, further comprising at least one of:
transmitting a session signaling response message from the ringback server to the first terminal; and
transmitting a second session signaling message from the ringback server to a second terminal.

12. The method of claim 11 wherein the session signaling response message comprises a Q.931 CONNECT message.

13. The method of claim 1 wherein the ringback server comprises a media gateway.

14. The method of claim 13 wherein the media gateway is adapted to convert the one or more media streams in a first protocol into the video ringback media stream in a second protocol.

15. The method of claim 14 wherein:
the first protocol is selected from the group consisting of RTSP-like, H.320-like, H.323-like, H.324-like, and SIP-like protocols; and
the second protocol is selected from the group consisting of RTSP-like, H.320-like, H.323-like, H.324-like, and SIP-like protocols.

16. The method of claim 14 wherein:
the first protocol comprises an RTSP-like protocol; and
the second protocol is selected from the group consisting of H.323-like, H.324-like, and SIP-like protocols.

17. The method of claim 14 wherein the first protocol comprises an RTSP-like protocol and the second protocol comprises an H.324-like protocol.

18. The method of claim 14 wherein the first protocol comprises an RTSP protocol and the second protocol comprises a 3G-324M protocol.

19. The method of claim 13 wherein the media gateway is adapted to convert the one or more media streams in a first one or more codecs into the video ringback media stream in a second codec.

20. The method of claim 1 further comprising determining a content of the video ringback media stream based on at least one of an identifier associated with a called party, an identifier associated with a calling party, subscriber information associated with the called party, or subscriber information associated with the calling party.

21. The method of claim 1 wherein reducing the involvement of the ringback server comprises transmitting an RLT message from the ringback server.

22. The method of claim 1 wherein the ringback server comprises a media gateway and an IP ringback server.

23. The method of claim 22 wherein reducing an involvement of the ringback server comprises referring one or more session aspects to the media gateway.

24. The method of claim 23 wherein referring one or more session aspects to the media gateway comprises transmitting a SIP ReINVITE message.

25. The method of claim 22 wherein reducing an involvement of the ringback server comprises referring one or more sessions to the media gateway, thereby removing the involvement of the IP ringback server.

26. The method of claim 25 wherein referring one or more sessions to the media gateway comprises transmitting a SIP REFER message.

27. The method of claim 22 wherein the IP ringback server comprises a SIP ringback server.

28. The method of claim 1 further comprising determining a content of the video ringback media stream based on at least one of an identifier associated with a called party, an identifier associated with a calling party, subscriber information associated with the called party, or subscriber information associated with the calling party.

29. The method of claim 1, wherein the first terminal is a 3G-324M terminal.

30. The method of claim 29 wherein the media gateway is adapted to process 3G-324M sessions.

31. The method of claim 30 wherein the media gateway is further adapted to process SIP sessions.

32. The method of claim 30 wherein the media gateway is further adapted to process H.320-like, H.323-like, H.324-like, RTSP-like, and SIP-like sessions.

33. The method of claim 1 wherein the content device and the ringback server are collocated.

34. The method of claim 1 wherein the second terminal comprises a 3G-324M terminal.

35. The method of claim 1 wherein the second terminal comprises a SIP terminal.

36. The method of claim 29 further comprising determining a content of the video ringback media stream based on at least one of an identifier associated with a called party, an identifier associated with a calling party, subscriber information associated with the called party, or subscriber information associated with the calling party.

37. The method of claim 29, further comprising at least one of:
    establishing one or more second channels between the ringback server and the second terminal; and
    associating the one or more first channels and the one or more second channels at the ringback server.

38. The method of claim 25, wherein the second session signaling message comprises a Q.931 SETUP message and the signaling response message comprises a Q.931 CONNECT message.

39. A method of providing video ringback services to terminals in a telecommunications network, the method comprising:
    storing a media content in one or more memories disposed in a content server, wherein the media content is stored in a first format;
    establishing a first media stream between the content server and a media server;
    establishing a second media stream between the media server and at least one of a first H.324-like terminal or a SIP-like terminal;
    establishing a third media stream between the media server and a second H.324-like terminal, wherein the second H.324-like terminal is different than the first H.324-like terminal or a SIP-like terminal;
    transcoding the media content in the media server to form a first ringback media stream characterized by a second format;
    transmitting the first ringback media stream to the at least one of the first H.324-like terminal or the SIP-like terminal;
    transcoding the media content in the media server to form a second ringback media stream characterized by a third format different from the second format;
    transmitting the second ringback media stream to the second H.324-like terminal; and
    reducing an involvement of a ringback server from a level associated with call establishment;
    wherein reducing the involvement of the ringback server comprises reducing a capability of the ringback server to that of a bearer conduit.

40. The method of claim 39 wherein the first format is selected from a group consisting of codecs configured for at least one of broadcast networks, 3GPP circuit switched networks, or 3GPP packet switched networks.

41. The method of claim 39 wherein the second format is selected from a group consisting of 3GPP codecs configured for at least one of 3GPP circuit switched networks or 3GPP packet switched networks.

42. The method of claim 39 wherein the third format is selected from a group consisting of 3GPP codecs configured for 3GPP circuit switched networks.

43. The method of claim 39 wherein the first format is H.264, the second format is selected from a group consisting of H.264, H.263, and MPEG4-Visual, and the third format is selected from a group consisting of H.264, H.263, and MPEG4-Visual.

44. The method of claim 39 further comprising determining a content of the first media stream based on at least one of an identifier associated with a called party, an identifier associated with a calling party, subscriber information associated with the called party, or subscriber information associated with the calling party.

* * * * *